(12) United States Patent
Jing et al.

(10) Patent No.: US 7,657,504 B2
(45) Date of Patent: Feb. 2, 2010

(54) USER INTERFACE FOR DISPLAYING IMAGES OF SIGHTS

(75) Inventors: Feng Jing, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 29 days.

(21) Appl. No.: 11/548,244

(22) Filed: Oct. 10, 2006

(65) Prior Publication Data

US 2008/0086686 A1  Apr. 10, 2008

(51) Int. Cl.
G06F 17/30 (2006.01)
(52) U.S. Cl. ............................. 707/2; 701/205; 701/206
(58) Field of Classification Search ...................... 707/1, 707/2, 100, 104.1, 200; 701/201, 202, 205, 701/206, 208, 210, 211, 213, 300
See application file for complete search history.

(56) References Cited

U.S. PATENT DOCUMENTS

| | | | |
|---|---|---|---|
| 4,888,646 A | 12/1989 | Umeda et al. |
| 5,301,018 A | 4/1994 | Smidth et al. |
| 5,579,471 A | 11/1996 | Barber et al. |
| 5,642,433 A | 6/1997 | Lee et al. |
| 5,751,286 A | 5/1998 | Barber et al. |
| 5,802,361 A | 9/1998 | Wang et al. |
| 5,875,446 A | 2/1999 | Brown et al. |
| 5,987,456 A | 11/1999 | Ravela et al. |
| 6,006,218 A | 12/1999 | Breese et al. |
| 6,115,717 A | 9/2000 | Mehrotra et al. |
| 6,256,623 B1 | 7/2001 | Jones |
| 6,321,226 B1 | 11/2001 | Garber et al. |
| 6,363,373 B1 | 3/2002 | Steinkraus |
| 6,445,834 B1 | 9/2002 | Rising, III |
| 6,470,307 B1 | 10/2002 | Turney et al. |
| 6,522,782 B2 | 2/2003 | Pass et al. |
| 6,523,021 B1 | 2/2003 | Monberg et al. |
| 6,549,897 B1 | 4/2003 | Katariya et al. |
| 6,556,710 B2 | 4/2003 | Pass et al. |
| 6,578,032 B1 | 6/2003 | Chandrasekar et al. |
| 6,643,641 B1 | 11/2003 | Snyder |
| 6,704,729 B1 | 3/2004 | Klein et al. |
| 6,728,752 B1 | 4/2004 | Chen et al. |
| 6,748,387 B2 | 6/2004 | Garber et al. |
| 6,748,398 B2 | 6/2004 | Zhang et al. |
| 6,766,320 B1 | 7/2004 | Wang et al. |

(Continued)

OTHER PUBLICATIONS

Ferragina et al., "The Anatomy of a Clustering Engine for Web-page Snippets," Jan. 29, 2004, University of Pisa, Tech. Report: TR-04-05.

(Continued)

Primary Examiner—Fred I Ehichioya
(74) Attorney, Agent, or Firm—Perkins Coie LLP

(57) ABSTRACT

A method and system for identifying sights associated with a location and for displaying images associated with those sights is provided. A tour system identifies sights associated with a location by submitting a search request formed using the location to an image search service. The tour system identifies salient phrases of metadata of the search results to be the candidate sight names. The tour system also provides a user interface for displaying the images associated with the locations. The user interface may present a slideshow of sights encountered when traveling on a trip.

16 Claims, 17 Drawing Sheets

U.S. PATENT DOCUMENTS

| | | | |
|---|---|---|---|
| 6,775,666 | B1 | 8/2004 | Stumpf et al. |
| 6,823,335 | B2 | 11/2004 | Ikeda et al. |
| 6,847,733 | B2 | 1/2005 | Savakis et al. |
| 6,901,411 | B2 | 5/2005 | Li et al. |
| 6,944,612 | B2 | 9/2005 | Roustant et al. |
| 6,978,275 | B2 | 12/2005 | Castellanos et al. |
| 7,010,751 | B2 | 3/2006 | Shneiderman |
| 7,017,114 | B2 | 3/2006 | Guo et al. |
| 7,047,482 | B1 | 5/2006 | Odom |
| 7,051,019 | B1 | 5/2006 | Land et al. |
| 7,065,520 | B2 | 6/2006 | Langford et al. |
| 7,099,860 | B1 | 8/2006 | Liu et al. |
| 7,111,002 | B2 | 9/2006 | Zhang et al. |
| 7,113,944 | B2 | 9/2006 | Zhang et al. |
| 7,158,878 | B2* | 1/2007 | Rasmussen et al. ......... 701/208 |
| 7,430,566 | B2 | 9/2008 | Li et al. |
| 7,492,921 | B2 | 2/2009 | Foote |
| 7,499,916 | B2 | 3/2009 | Liu et al. |
| 7,617,176 | B2 | 11/2009 | Zeng et al. |
| 2001/0049700 | A1 | 12/2001 | Ichikura |
| 2003/0023600 | A1 | 1/2003 | Nagamura et al. |
| 2003/0126235 | A1 | 7/2003 | Chandrasekar et al. |
| 2004/0044469 | A1* | 3/2004 | Bender et al. ............... 701/208 |
| 2004/0225667 | A1 | 11/2004 | Hu et al. |
| 2004/0249774 | A1 | 12/2004 | Caid et al. |
| 2004/0267740 | A1 | 12/2004 | Liu et al. |
| 2006/0026152 | A1 | 2/2006 | Zeng et al. |
| 2006/0242178 | A1 | 10/2006 | Butterfield et al. |
| 2007/0174269 | A1 | 7/2007 | Jing et al. |
| 2007/0174865 | A1 | 7/2007 | Jing et al. |
| 2007/0174872 | A1 | 7/2007 | Jing et al. |
| 2007/0198182 | A1* | 8/2007 | Singh ......................... 701/211 |
| 2007/0209025 | A1 | 9/2007 | Jing et al. |

OTHER PUBLICATIONS http://www.flickr.com, Archived on http:/www.archive.org on Feb. 18, 2005, pp. 1-5, available on http://web.archive.org/web/20050218030404/http://flickr.com.

Kherfi et al., "Image Retrieval from the World Wide Web Issues," Techniques and Systems, Mar. 2004, ACM Computing Surveys, vol. 36, No. 1, pp. 35-67.

Mysore et al., "Diogenes: A Distributed Search Agent," May 2003, Technical Reports CSE-2003-24.

U.S. Appl. No. 11/548,253, Jing.

Altavista image, http://www.altavista.com/images, one page [last accessed Jul. 14, 2006].

Brin, Sergey and Lawrence Page, "The anatomy of a large-scale hypertextual (Web) search engine," In the 7th International World Wide Web Conference, 1998.

Broder, Andrei, "A taxonomy of web search," SIGIR Forum 36(2), 2002, 8 pages.

Cai, Deng et al., "Hierarchical Clustering of WWW Image Search Results Using Visual, Textual and Link Analysis," MM'04, Oct. 10-16, 2004 New York, New York, © 2004 ACM.

Chang, Shi Kuo and Arding Hsu, "Image Information Systems: Where do we go from here?," IEEE Transactions on Knowledge and Data Engineering, vol. 4, No. 5, Oct. 1992, pp. 431-442.

Chau, Michael et al., "Personalized Spiders for Web Search and Analysis," JCDL'01, Jun. 24-28, 2001, Roanoke, Virginia, © 2001, ACM.

Chen, Hao and Susan Dumais, "Bringing Order to the Web: Automatically Categorizing Search Results," Proceedings of CHI'00, Human Factors in Computing Systems, pp. 145-152.

Chen, Zheng et al., "iFind: A Web Image Search Engine," In Proc. ACM SIGIR, 2001, one page.

Citeseer, Scientific Literature Digital Library, http://citeseer.ist.psu.edu, one page [last accessed Jul. 14, 2006].

Ditto, http://ditto.com/, one page [last accessed Jul. 14, 2006].

Dumais, Susan, Edward Cutrell and Hao Chen, "Optimizing Search by Showing Results in Context," SIGCHI'01, Mar. 31-Apr. 4, 2001, Seattle, Washington, © 2001 ACM.

Frankel, Charles, Michael J. Swain and Vassilis Athitsos, "WebSeer: An Image Search Engine for the World Wide Web," Aug. 1, 1996, Technical Report 96-14, The University of Chicago, Computer Science Department, pp. 1-24.

Froogle, Google product search, http://froogle.google.com, one page [last accessed Jul. 14, 2005].

Glance, Natalie S., "Community Search Assistant," IUI'01, Jan. 14-17, 2001, Santa Fe, New Mexico, © 2001 ACM, pp. 91-96.

Google image search, http://images.google.com, [last accessed Jun. 7, 2007].

Google Maps, Google local search, http://local.google.com/, one page [last accessed Jul. 14, 2006].

Google web search, http://www.google.com, [last accessed Jun. 7, 2007].

GoogleNews, Google news search, http://news.google.com, 4 pages [last accessed Jul. 14, 2006].

GoogleVideo, Google video search, http://video.google.com, one page [last accessed Jul. 14, 2006].

Halkidi, Maria et al., "THESUS: Organizing Web document collections based on link semantics," The VLDB Journal (2003) / Digital Object Identifier, © Springer-Verlag 2003, pp. 1-13.

Hearst, Marti A. and Jan O. Pedersen, "Reexamining the Cluster Hypothesis: Scatter/Gather on Retrieval Results," In the Proceedings of ACM SIGIR, Aug. 1996, Zurich.

Huang, Jing et al., "Image Indexing using color correlograms," In Proc. IEEE Comp. Soc. Conf. Comp. Vis. and Patt. Rec., 1997, pp. 762-768.

Huang, Xiaodi and Wei Lai, "Force-Transfer: A New Approach to Removing Overlapping Nodes in Graph Layout," In Proc. The 25th Australasian Computer Science Conference 2003, Conferences in Research and Practice in Information Technology, vol. 16, © 2003 Australian Computer Society, 10 pages.

IMDB, Formula for calculating the top rated 250 titles in imdb, http://www.imdb.com/chart/top, 8 pages [last accessed Jul. 14, 2006].

Jansen, Major Bernard J. et al., "Real life information retrieval: a study of user queries on the Web," ACM SIGIR Forum 1998, vol. 32, No. 1, pp. 5-17.

Krishnapuram, Raghu et al., "Low-Complexity Fuzzy Relational Clustering Algorithms for Web Mining," Aug. 2001, IEEE, vol. 9, Issue 4, pp. 595-607.

Lempel, Ronny and Aya Soffer, "PicASHOW: Pictorial Authority Search by Hyperlinks on the Web," Proceedings of the 10th International WWW Conference, Hong Kong, China, 2001, ACM, pp. 438-448.

Li, Zhiwei et al., "Grouping WWW Image Search Results by Novel Inhomogeneous Clustering Method," Proceedings of the 11th International Multimedia Modelling Conference (MMM '05), © 2005 IEEE, 7 pages.

Liu, Bing et al. "Mining Topic-Specific Concepts and Definitions on the Web," WWW 2003, May 20-24, 2003, Budapest, Hungary, ACM.

Liu, Hao et al., "Effective Browsing of Web Image Search Results," MIR'04, Oct. 15-16, 2004, New York, New York, © 2004 ACM.

Luo, Bo, Xiaogang Wang and Xiaoou Tang, "A World Wide Web Based Image Search Engine Using Text and Image Content Features," Internet Imaging IV, Proceedings of SPIE-IS&T, Electronic Imaging, SPIE, vol. 5018, 2003, © 2003 SPIE-IS&T, pp. 123-130.

MSRA clustering search, http://rwsm.directtaps.net/, [last accessed Jun. 7, 2007].

Mukherjea, Sougata, Kyoji Hirata and Yoshinori Hara, "Using Clustering and Visualization for Refining the Results of a WWW Image Search Engine," NPIV 98, Bethesda, Maryland, © ACM 2000, pp. 29-35.

Nie, Zaiqing et al., "Object-Level Ranking: Bringing Order to Web Objects," WWW 2005, May 10-14, 2005, Chiba, Japan, ACM.

Nie, Zaiqing et al., "Object-level Web Information Retrieval," Technical Report of Microsoft Research, MSR-TR-2005-11, 2005, 8 pages.

Ong, Hwee-Leng et al., "FOCI: Flexible Organizer for Competitive Intelligence," Proceedings of the 10th International Conference on Information and Knowledge Management, Oct. 5-10, 2001, Atlanta, Georgia, http://www.ntu.edu.sg/home/asahtan/Papers/foci_itwp01.pdf, [last accessed Jan. 3, 2008].

Page, L. et al., "The PageRank Citation Ranking: Bringing Order to the Web," Jan. 29, 1998, Stanford University Technical Report, pp. 1-17.

Photosig, http://www.photosig.com, [last accessed Aug. 17, 2006].

PicSearch, http://www.picsearch.com, one page [last accessed Jul. 14, 2006].

Roussinov, Dmitir et al., "Visualizing Internet Search Results with Adaptive Self-Organizing Maps," 1999, http://www.public.asu.edu/~droussi/sigir99/demo.htm, [last accessed Dec. 7, 2007].

Rui, Yong and Thomas S. Huang, "Image Retrieval: Current Techniques, Promising Directions and Open Issues", Journal of Visual Communication and Image Representation, vol. 10, 39-62, Mar. 1999, © 1999 by Academic Press.

Sarkar, Manojit and Marc H. Brown, "Graphical Fisheye Views," Communications of the ACM. Dec. 1994, vol. 37, No. 12, © ACM, pp. 73-84.

Savakis, Andreas E., Stephen P. Etz and Alexander C. Loui, "Evaluation of image appeal in consumer photography," In Proceedings SPIE Human Vision and Electronic Imaging V, Jan. 2000, pp. 1-10.

Scholar, Google scholar paper search, http://Scholar.google.com, one page [last accessed Jul. 14, 2006].

Sclaroff, Stan, Leonid Taycher and Marco Lacascia, "ImageRover: A Content-Based Image Browser for the World Wide Web," In IEEE Workshop on Content-based Access of Image and Video Libraries, San Juan, Puerto Rico, Jun. 1997, pp. 2-9.

Sclaroff, Stan, Marco La Cascia and Saratendu Sethi, "Unifying Textual and Visual Cues for Content-Based Image Retrieval on the World Wide Web," Computer Vision and Image Understanding, Vo. 75, Nos. 1/2, Jul./Aug. 1999, © 1999 by Academic Press, pp. 86-98.

Shen, Heng Tao et al., "Giving Meanings to WWW Images," Proceedings of ACM Multimedia 2000, Los Angeles, CA, pp. 39-47, © ACM 2000.

Smeulders, Arnold W.M. et al., "Content-Based Image Retrieval at the End of the Early Years," IEEE Transactions on Pattern Analysis and Machine Intelligence, vol. 22, No. 12, Dec. 2000, pp. 1349-1380, © 2000 IEEE.

Smith, John R. and Shih-Fu Chang, "Visually Searching the Web for Content," IEEE Multimedia, 1997, pp. 12-20, © 1997 IEEE.

Sullivan, Danny, "Hitwise Search Engine Ratings," Search Engine Watch, www.searchenginewatch.com, Aug. 23, 2005, Incisive Interactive Marketing LLC, 2005, 3 pages.

Susstrunk, Sabine and Stefan Winkler, "Color Image Quality on the Internet," In IS&T/SPIE Electronic Imaging 2004: Internet Imaging V, vol. 5304, 2004, pp. 118-131.

Teevan, Jaime et al., "The Perfect Search Engine Is Not Enough: A Study of Orienteering Behavior in Directed Search," CHI 2004, Apr. 24-29, Vienna, Austria, , pp. 415-422.

Tong, Hanghang et al., "Classification of Digital Photos Taken by Photographers or Home Users," In Proceedings of Pacific-Rim Conference on Multimedia (PCM), 2004, pp. 198-205.

Toyama, Kentaro et al., "Geographic Location Tags on Digital Images," MM'03, Nov. 2-8, 2003, Berkeley, California, © 2003 ACM.

Vivisimo clustering search, http://vivisimo.com, [last accessed Jun. 7, 2007].

Wang, Xin-Jing et al., "Grouping Web Image Search Result," MM'04, Oct. 10-16, 2004, New York, New York, pp. 436-439, © 2004 ACM.

White, David A. and Ramesh Jain, "Similarity Indexing: Algorithms and Performance," 2 / SPIE, Feb. 1-2, 1996, San Jose, California, vol. 2670, pp. 63-73, © 1996 The Society of Photo-Optical Instrumentation Engineers.

Woodruff, Allison et al., "Using Thumbnails to Search the Web," Proceedings of SIGCHI, Mar. 31-Apr. 4, 2001, Seattle, Washington, pp. 198-205, © 2001 ACM.

Xi, Wensi et al., Link Fusion: A Unified Link Analysis Framework for Multi-Type Interrelated Data Objects, WWW 2004, New York, © ACM, pp. 319-327.

Yahoo Homepage search, http://www.yahoo.com/, [last accessed Jun. 7, 2007].

Yahoo image search, http://images.search.yahoo.com/, [last accessed Jun. 7, 2007].

Yee, Ka-Ping et al., "Faceted Metadata for Image Search and Browsing,"In Proc. CHI 2003, Florida, © 2003 ACM, 8 pages.

Zamir, Oren and Oren Etzioni, "Web Document Clustering: A Feasibility Demonstration," In Proceedings of SIGIR'98, Melbourne, Australia, pp. 46-54, © 1998 ACM.

Zeng, H.J. et al, "Learning to Cluster Web Search Results," SIGIR'04, Jul. 25-29, 2004, Sheffield, South Yorkshire, UK, © 2004 ACM.

Zhang, L. et al., "Enjoy High Quality Photos in Vertical Image Search Engine," Submitted to the SIGCHI 2006 Conference on Human Factors in Computing Systems.

\* cited by examiner

USER INTERFACE FOR DISPLAYING IMAGES OF SIGHTS

CROSS-REFERENCE TO RELATED APPLICATION(S)

This application is related to U.S. patent application Ser. No. 11/548,253, entitled "IDENTIFYING SIGHT FOR A LOCATION" filed concurrently herewith and identified by, the disclosure of which is incorporated by reference herein in its entirety.

BACKGROUND

The web (i.e., World Wide Web) is increasingly being used by people to plan their travels. A person planning a trip has many web-based resources available including web page search engine services, image search engine services, photographic forums, travel-related web sites, online travel booking services, and so on. Web page search engine services, such as Google and Overture, provide for searching for information on web pages that may be of interest to users. After a user submits a search request (also referred to as a "query") that includes search terms, the search engine service identifies web pages that may be related to those search terms. For example, a user planning a trip to Cairo, Egypt may enter the query "Cairo Egypt tourism." To quickly identify related web pages, the search engine services may maintain a mapping of keywords to web pages. This mapping may be generated by "crawling" the web to identify the keywords of each web page. To crawl the web, a search engine service may use a list of base web pages to identify all web pages that are accessible through those base web pages. The keywords of any particular web page can be identified using various well-known information retrieval techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Several search engine services also provide for searching for images that are available on the Internet. These image search engines typically generate a mapping of keywords to images by crawling the web in much the same way as described above for mapping keywords to web pages. An image search engine service can identify keywords based on text of the web pages that contain the images. An image search engine may also gather keywords from metadata associated with images of web-based image forums, which are an increasingly popular mechanism for people to publish their photographs and other images. An image forum allows users to upload their photographs and requires the users to provide associated metadata such as title, camera setting, category, and description. The image forums typically allow reviewers to rate each of the uploaded images and thus have ratings on the quality of the images. Regardless of how the mappings are generated, an image search engine service inputs an image query and uses the mapping to find images that are related to the image query. An image search engine service may identify thousands of images that are related to an image query and presents thumbnails of the related images. To help a user view the images, an image search engine service may order the thumbnails based on relevance of the images to the image query. An image search engine service may also limit the number of images that are provided to a few hundred of the most relevant images so as not to overwhelm the viewer.

It can be very tedious for a person to plan a trip using the currently available web-based resources. For example, a person planning an automobile trip from Los Angeles, Calif. to Washington, D.C. would need to identify various routes, identify the locations (e.g., cities or counties) along the routes, identify sights associated with each location (e.g., Gateway Arch in St. Louis, Mo.), evaluate the routes and sights, and select a preferred route and sights to visit along that route. Although it may be easy for a person to identify various routes, it can be difficult to identify the sights that may be of interest along each route. If the person knows the name of a sight, the person can submit web page or image search requests. The person can then attempt to evaluate the search results to decide whether to visit that sight. If the person, however, does not know all the possible sights for a route, the person may need to consult various travel resources (e.g., books and visitor bureau web sites) that may describe the sights for the various locations along a route. Not only is the process tedious, the person may not even identify the most desirable sights or may overlook a desirable sight that is identified, because the quality of images and information available varies greatly from sight to sight and resource to resource.

SUMMARY

A method and system for identifying sights associated with a location is provided. A tour system identifies sights associated with a location by submitting a search request formed using the location to an image search service. The search results identify images relating to the location and provide metadata associated with each image. The tour system then identifies names of candidate sights from the metadata of the search results. The tour system may consider the salient phrases of the metadata to be the candidate sight names. Since the candidate sight names may include phrases that do not represent sights that can be visited, the tour system determines which of the candidate sight names represent actual sights. The tour system then discards those candidate sight names which do not represent actual sights and uses the remaining candidate sight names as the names of sights associated with the location. The tour system may then generate a mapping of location to sight names so that the sights associated with a location can be identified quickly.

The tour system allows a user to search for sights of interest that are associated with specified locations. When a user specifies the location, the tour system uses the mapping of locations to sights to identify the sights of interest associated with that location. The tour system may display the names of the associated sights of interest to the user. Alternatively, the tour system may use the names of the sights of interest to identify images associated with each sight of interest. The tour system may submit the name of each sight of interest to an image search service to identify images associated with that sight. The tour system may consider the images of the search result for a sight to represent a cluster of images associated with that sight. The tour system may then display a representative image of each sight. The tour system may also simultaneously display a map encompassing and identifying the location and the sights.

The tour system may automatically identify travel locations of interest between a start location and an end location of a trip. The tour system then identifies sights associated with each travel location along a route or travel path between the start location and the end location. The tour system identifies images for each sight and allows the user to browse through the images. The tour system may automatically identify a route between the start location and the end location. Alternatively, the tour system may allow the user to designate the route between the start location and the end location by tracing the route on a displayed map. The tour system may identify travel locations based on their distance from the route. When a travel location is selected, the tour system may display representative images of each sight associated with that location. When a representative image of a sight is selected, the tour system may display multiple images associated with that sight. In addition, the tour system may present a slideshow of the images of the sights associated with the travel locations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
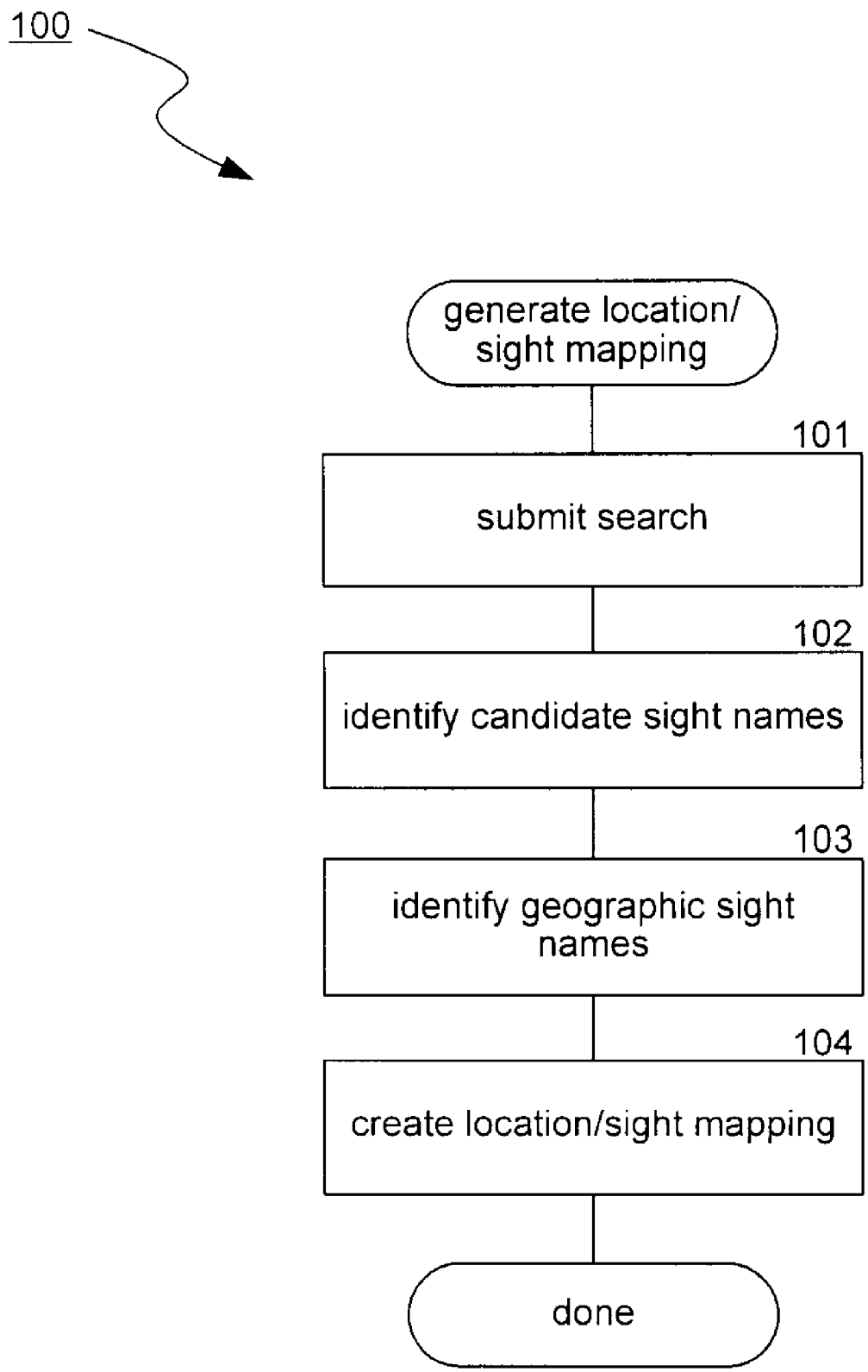
FIG. 1 is a flow diagram illustrating high-level processing of a generate location/sight mapping component of the tour system in one embodiment.

A method and system for identifying sights associated with a location is provided. In one embodiment, a tour system identifies sights associated with a location by submitting a search request formed using the location to an image search service. For example, the image search service may be a search provided by a web-based image forum. The location may be St. Louis, and the search request may be "St. Louis Mo." The search results identify images relating to the location and provide metadata (e.g., image title and quality rating) associated with each image. For example, the search results for the search request "St. Louis Mo." may include an image with the title "Building the Gateway Arch." The tour system then identifies names of candidate sights from the metadata of the search results. The tour system may consider the salient phrases (e.g., Gateway Arch or great sunset) of the metadata to be the candidate sight names. Since the candidate sight names may include phrases that do not represent sights that can be visited (e.g., great sunset), the tour system determines which of the candidate sight names represent geographic names. The tour system then discards those candidate sight names which do not represent geographic names and uses the remaining candidate sight names as the names of sights associated with the location. For example, the tour system may submit each candidate sight name (alone or in combination with the location) to a geographic name service to determine whether that candidate sight name corresponds to a geographic name. For example, if the candidate sight names include "Gateway Arch" and "great sunset," then the tour system will discard "great sunset" because it does not correspond to a geographic name. The tour system then generates a mapping of location to sight names so that the sights associated with a location can be identified quickly. For example, the tour system may map the location St. Louis to the sights of Gateway Arch, Missouri Botanical Garden, St. Louis Art Museum, and so on. In this way, the tour system can quickly identify sights that may be of interest to a person planning to travel to a location.

In one embodiment, the tour system allows a user to search for sights of interest that are associated with specified locations. When a user specifies the location, the tour system uses the mapping of locations to sights to identify the sights of interest associated with that location. The tour system may display the names of the associated sights of interest to the user. For example, if the user specifies the location St. Louis, the tour system may identify and display the names of the Gateway Arch, Missouri Botanical Garden, and St. Louis Art Museum. Alternatively, the tour system may use the names of the sights of interest to identify images associated with each sight of interest. The tour system may submit the name of each sight of interest to an image search service to identify images associated with that sight. The tour system may consider the images of the search result for a sight to represent a cluster of images associated with that sight. The tour system may then display a representative image of each sight. For example, if the search results for "Gateway Arch" return 50 images and the search results for Missouri Botanical Garden return 10 images, the tour system may select a representative image for each sight based on relevance of the metadata to the query and quality rating of the images. The tour system may also simultaneously display a map encompassing and identifying the location and the sights. When a user selects an image representing a sight, the tour system may display additional images of the sight. The tour system may allow the user to scroll through the images that are displayed.

In one embodiment, the tour system automatically identifies travel locations of interest between a start location and an end location of a trip. The tour system automatically identifies sights associated with each travel location along a route or travel path between the start location and the end location. The tour system may allow entry of additional attributes of the route such as names of various locations along the route. The tour system then identifies images for each sight and allows the user to browse through the images. For example, a user may specify the start location of Los Angeles and the end location of Washington, D.C. for a trip. The tour system may then identify St. Louis as a travel location along the travel path. The start and end locations may also be considered to be travel locations, and the start location and the end location may be the same location. The tour system may automatically identify a route between the start location and the end location. Alternatively, the tour system may allow the user to designate the route between the start location and the end location by tracing the route on a displayed map. The tour system may identify travel locations based on their distance from the route. For example, if the route is 300 miles, then the tour system may identify travel locations that are within 30 miles of the route. The tour system may display a representative image for each travel location and highlight the travel location on a map. When a travel location is selected (e.g., by selecting a representative image or selecting the location on the map), the tour system may display representative images of each sight associated with that location. When a representative image of a sight is selected, the tour system may display multiple images associated with that sight. In addition, the tour system may present a slideshow of the images of the sights associated with the travel locations. The tour system may order the images of the slideshow based on the order in which they would be encountered when traveling from the start location to the end location.

In the following, a description of an embodiment of the tour system is described in detail with reference to the figures. FIG. 1 is a flow diagram illustrating high-level processing of a generate location/sight mapping component of the tour system in one embodiment. The component 100 is provided with a location and generates a mapping of that location to associated sights. In block 101, the component submits the location as a search request to an image search service. The search results identify images that are relevant to that location and their related metadata including an image title, an image description, and a quality of image rating. In block 102, the component identifies candidate sight names from the metadata of the search results. The candidate sight names may be salient phrases extracted from the text of the metadata. In block 103, the component identifies the candidate sight names that are geographic names. For example, the component may submit each candidate sight name to a geographic name service to determine whether the candidate sight name is a geographic name. The component selects the candidate sight names that are geographic names as the actual sight names associated with the location. In block 104, the component creates a mapping of the location to the sight names and completes. The location/sight mapping can be used by a user interface component of the tour system to facilitate identifying sights associated with locations.

Figure 2:
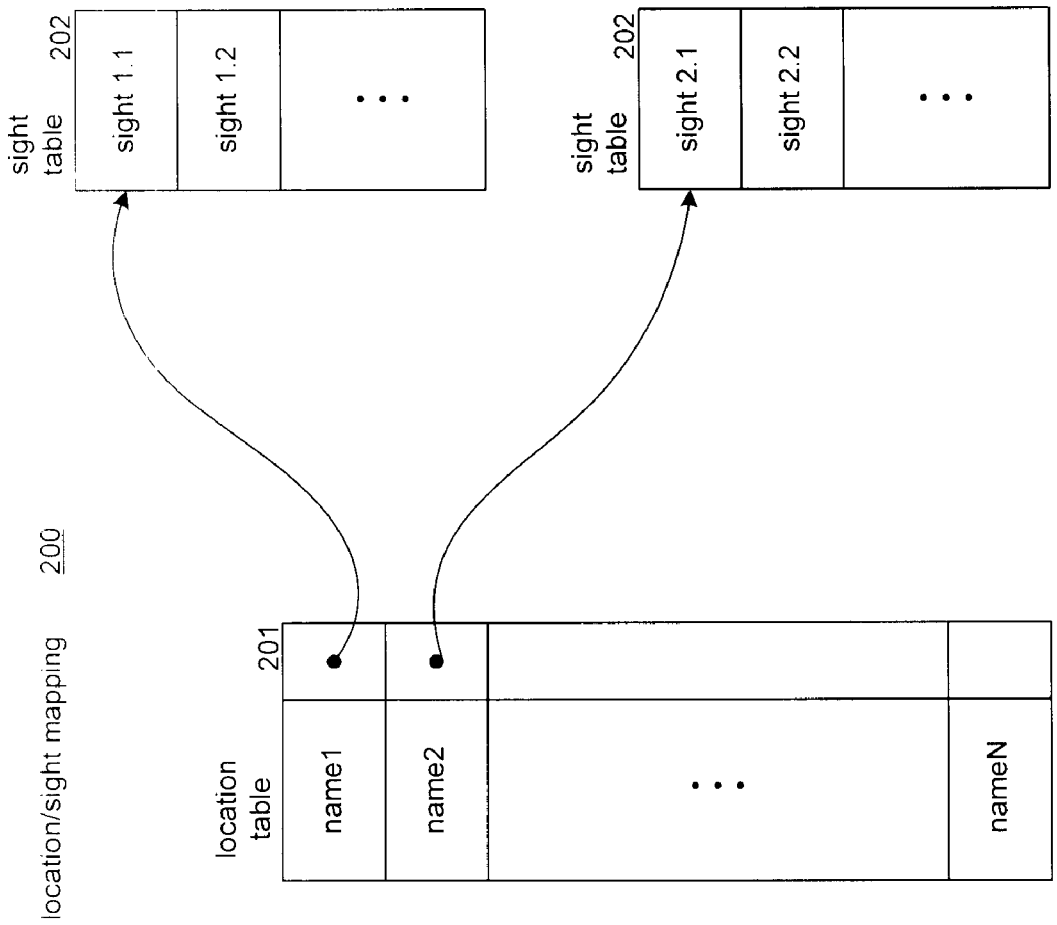
FIG. 2 is a block diagram that illustrates a data structure for representing the location/sight mapping in one embodiment.

FIG. 2 is a block diagram that illustrates a data structure for representing the location/sight mapping in one embodiment. The location/sight mapping 200 includes a location table 201 and sight tables 202. The location table includes an entry for each location along with a pointer to a sight table for that location. Each sight table contains an entry containing the name of the sight for each sight associated with a location. For example, the location table may contain an entry for St. Louis that contains the name "St. Louis" and a reference to a sight table. The entries of that sight table may include the sight names of "Gateway Arch," "Missouri Botanical Garden," "St. Louis Art Museum," and so on.

Figure 3:
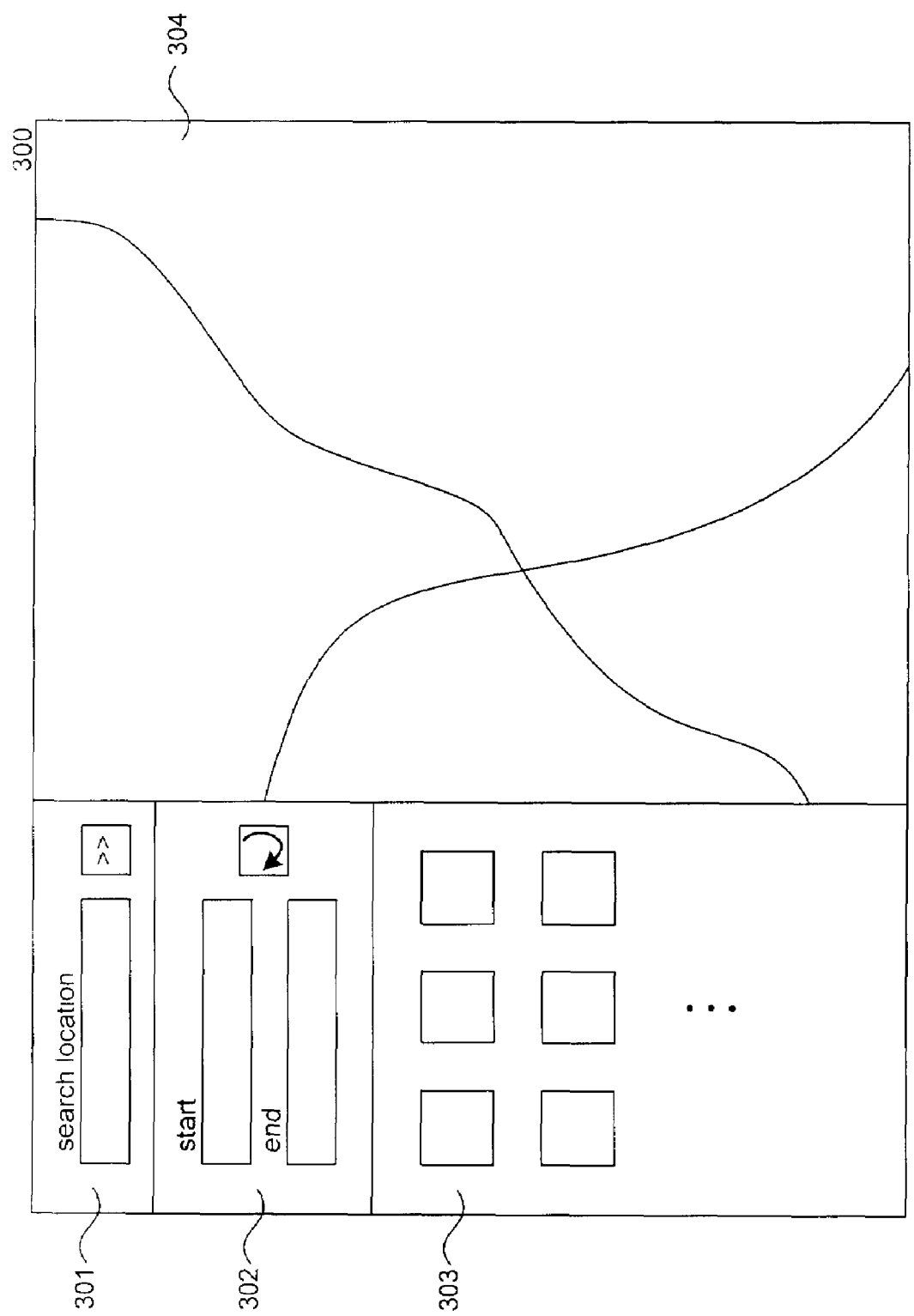
FIG. 3 is a display page that illustrates a user interface of the tour system in one embodiment.

FIG. 3 is a display page that illustrates a user interface of the tour system in one embodiment. The display page 300 includes a search by location area 301, a search by path area 302, an image panel 303, and a map panel 304. A user can search for sights by location, by path, or by map. To search for sights by location, a user enters the name of a location (e.g., St. Louis) into the search by location area 301 and selects the search arrows. The tour system uses the location/sight mapping to identify sights associated with that location, searches for images associated with each sight, and displays an image representing each sight within the image panel. The tour system may order the sights based on popularity of the sights and order the images for each sight based on a score that is a combination of relevance of the metadata of the image to the sight name and quality of the image. The popularity of a sight may be determined in various ways such as based on the number and quality of images of that sight, based on the number of clicks on images for the sights that are collected over time, and so on. The tour system may order displayed images so that the highest scored image of each sight is displayed before the second highest scored image of any sights and the highest scored images are ordered based on popularity of the sights. Thus, the tour system may display the highest scored image of the most popular sight first, followed by the highest scored image of the second most popular sight, and so on until the highest scored image of each sight is displayed. The tour system may then display the second highest scored image of the most popular sight followed by the second highest scored image of the second most popular sight, and so on. The tour system may also simultaneously display in the map panel a map that encompasses all the sights of the location. When a user selects an image from the image panel, the tour system then highlights the sight associated with that image within the map panel and displays the images of that sight within the image panel. A user can select an image to see an enlarged view of the image along with its metadata or hover a pointer over an image to see some of the metadata displayed near the image.

Figure 4:
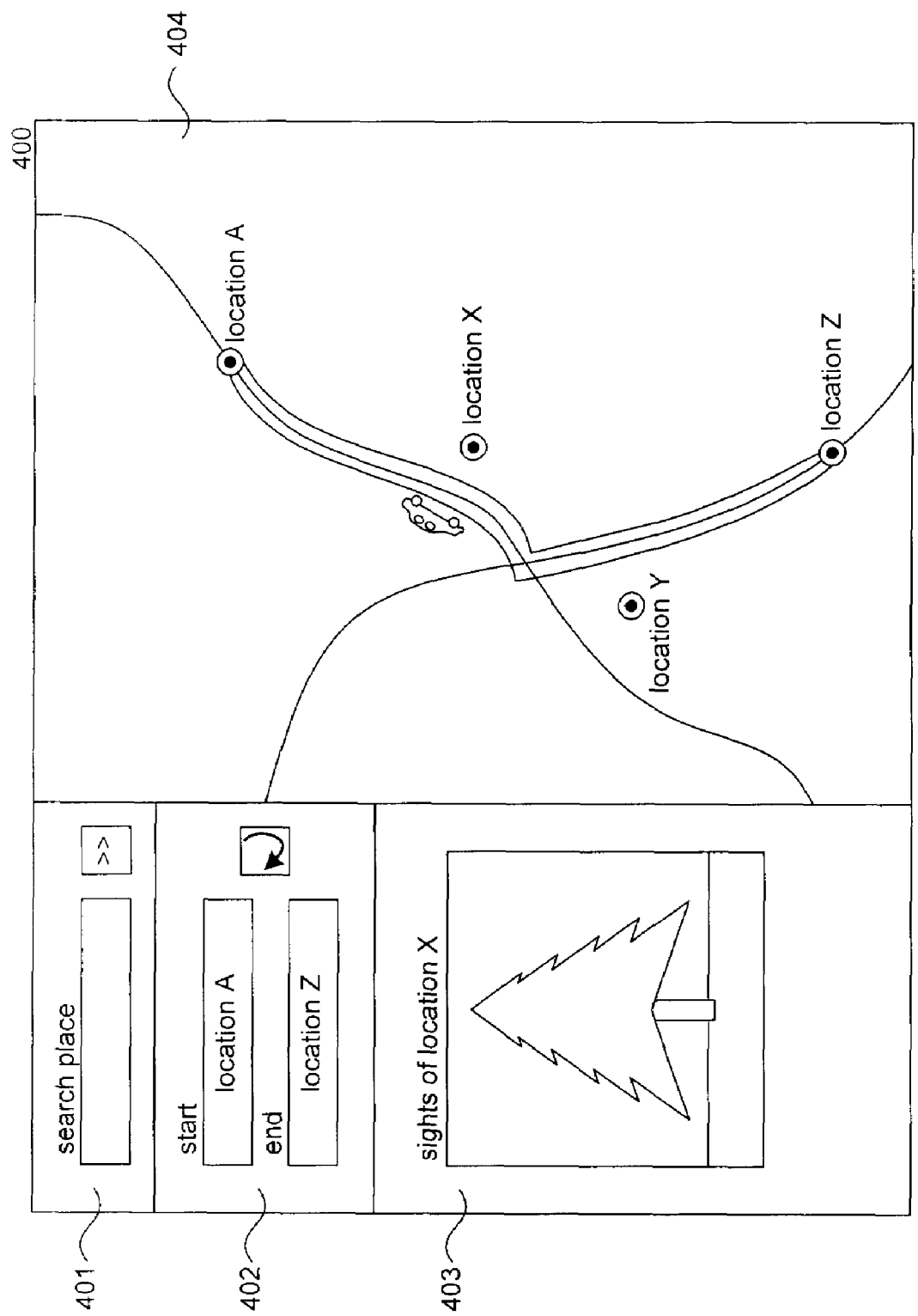
FIG. 4 is a display page that illustrates a search by path user interface of the tour system in one embodiment.

FIG. 4 is a display page that illustrates a search by path user interface of the tour system in one embodiment. The display page 400 includes a search by location area 401, a search by path area 402, an image panel 403, and a map panel 404. A user has entered a start location (e.g., location A) and an end location (e.g., location Z) into the search by path area. The tour system has automatically identified and highlighted a travel path between the start location and the end location. The tour system then identified additional travel locations (e.g., location X and location Y) along the travel path. The tour system identified the sights of each travel location using the location/sight mapping and searched for images for each of the travel locations. The tour system initially displayed an image representing each travel location in the image panel. When the user selected an image, the tour system displayed an image representing each of the sights associated with the location of the selected image. The user then selected to view a slideshow of the sights associated with the travel path. The tour system displays the slides of the slideshow in the image panel along with the name of the location, the name of the sight, and the title of the image. The tour system also displays a moving automobile in the map area indicating the location whose sights are currently being displayed in the slideshow. The tour system may display the images of the sights of a location in the slideshow based on sight popularity and image score. The tour system may also allow the user to select the length of the slideshow (e.g., five minutes) or may automatically select the length to be a fixed amount (e.g., five minutes) or a variable length (e.g., based on number of locations and sights along the travel path).

Figure 5:
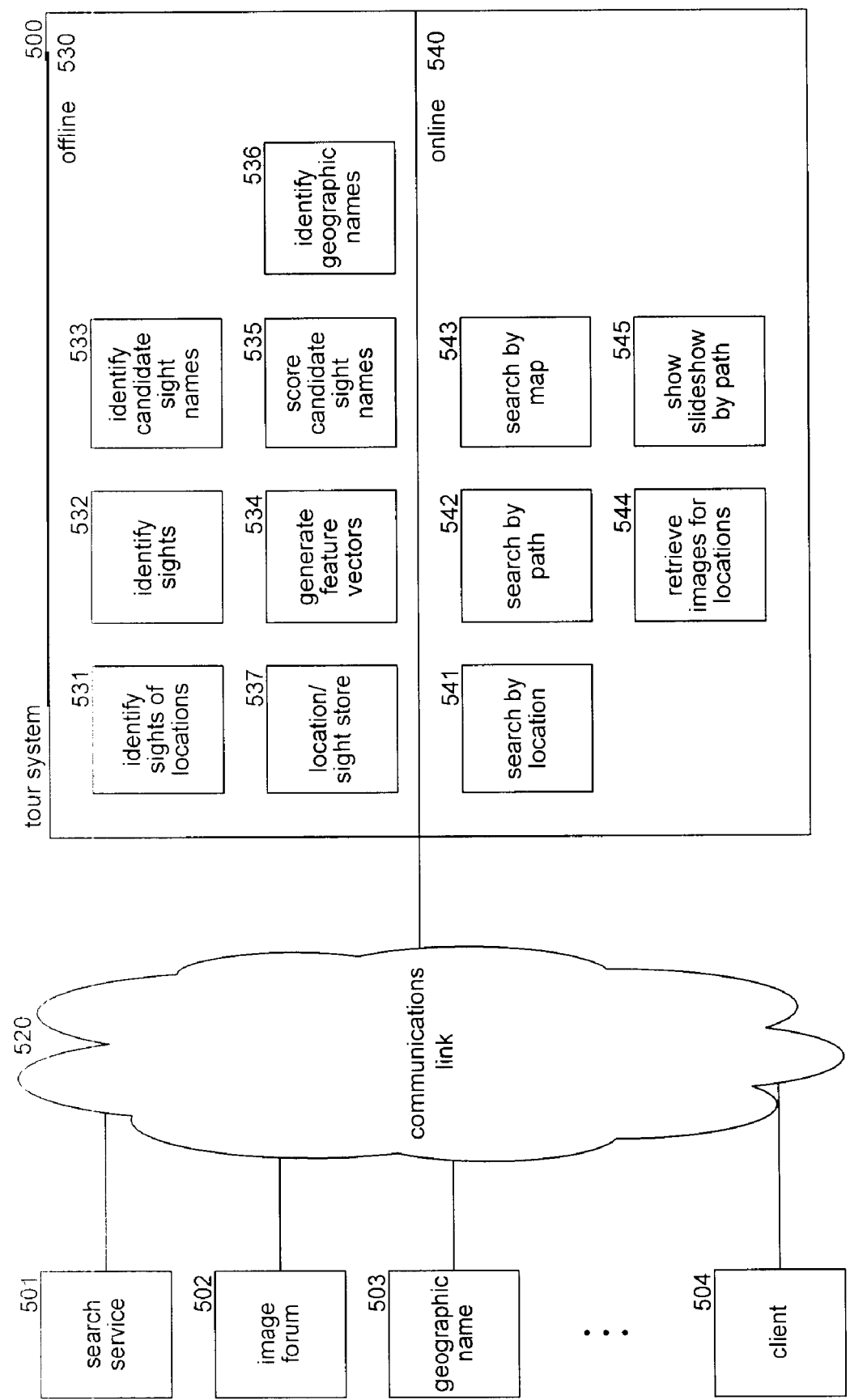
FIG. 5 is a block diagram illustrating components of the tour system in one embodiment.

FIG. 5 is a block diagram illustrating components of the tour system in one embodiment. The tour system 500 is connected to various computing systems 501-504 via communications link 520. The computing systems may include one or more search service servers 501 (e.g., MSN Search), one or more image forum servers 502 (e.g., www.photosig.com), one or more geographic name servers 503 (e.g., Microsoft's VirtualEarth), and one or more client computing devices 504. The users of the tour system use the client computing devices to plan their travels using a web-based user interface provided by the tour system. The tour system includes offline components 530 and online components 540. The offline components include an identify sights of locations component 531, an identify sights component 532, an identify candidate sight names component 533, a generate feature vectors component 534, a score candidate sight names component 535, and an identify geographic names component 536. The tour system also includes a location/sight store 537 that is written to by the offline components and read by the online components. The online components include a search by location component 541, a search by path component 542, a search by map component 543, a retrieve images for locations component 544, and a show slideshow by path component 545. These components of the tour system are explained in detail below with reference to flow diagrams.

The computing devices on which the tour system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the tour system. In addition, the instructions, data structures, and message structures may be stored or transmitted via a data transmission medium, such as a signal on a communications link. Various communications links may be used, such as the Internet, a local area network, a wide area network, or a point-to-point dial-up connection.

The tour system may be implemented on various computing systems or devices including personal computers, server computers, multiprocessor systems, microprocessor-based systems, network PCs, minicomputers, mainframe computers, distributed computing environments that include any of the above systems or devices, and the like. The tour system may be used by various computing systems such as personal computers, cell phones, personal digital assistants, consumer electronics, home automation devices, and so on.

The tour system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the offline components and online components may be implemented on different computing systems. Also, some of the offline components may be implemented as online components and vice versa.

Figure 6:
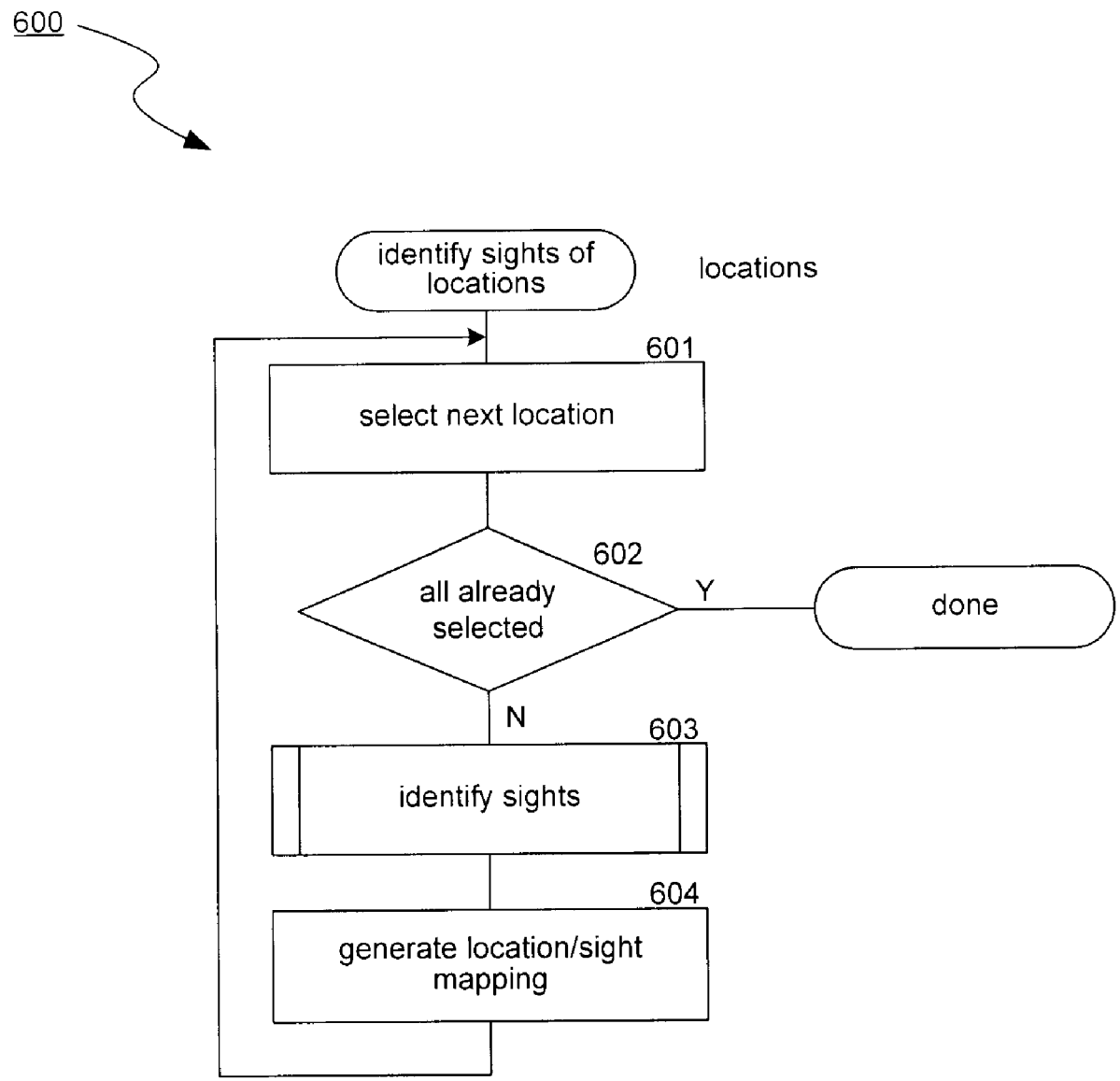
FIG. 6 is a flow diagram that illustrates the processing of the identify sights of locations component of the tour system in one embodiment.

FIG. 6 is a flow diagram that illustrates the processing of the identify sights of locations component of the tour system in one embodiment. The component 600 is provided a list of locations and identifies sights associated with each of the locations. In block 601, the component selects the next location. In decision block 602, if all the locations have already been selected, then the component completes, else the component continues at block 603. In block 603, the component invokes the identify sights component to identify sights for the selected location. In block 604, the component generates a mapping of the selected location to the identified sights and then loops to block 601 to select the next location.

Figure 7:
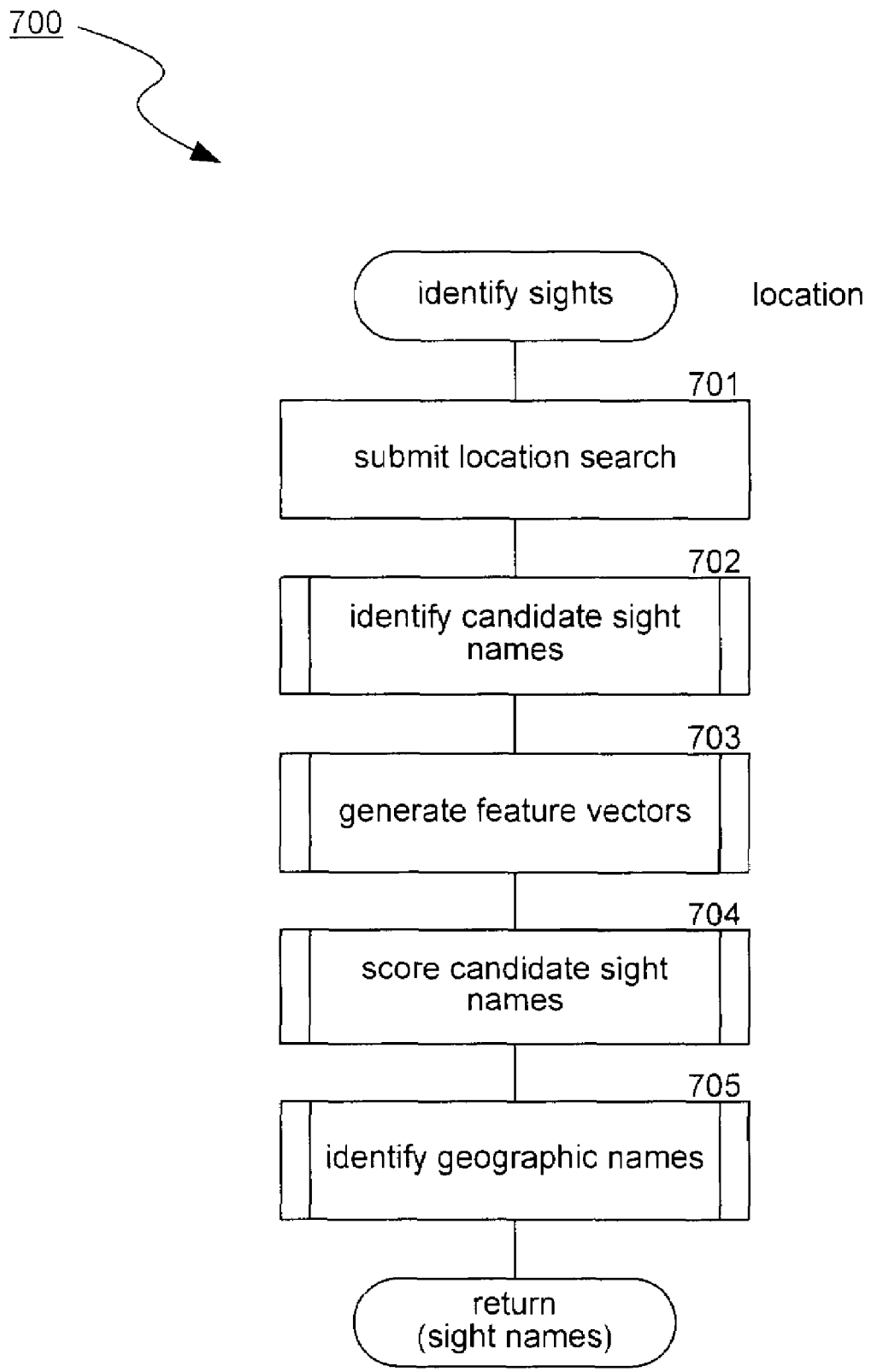
FIG. 7 is a flow diagram that illustrates the processing of the identify sights component of the tour system in one embodiment.

FIG. 7 is a flow diagram that illustrates the processing of the identify sights component of the tour system in one embodiment. The component 700 is passed a location and identifies the sights associated with that location. In block 701, the component submits the location as a query to a search service, which may be an image search service, and receives images and associated metadata as the search results. In block 702, the component invokes the identify candidate sight names component to identify candidate sight names from the search results. For example, the candidate sight names may be salient phrases within the metadata of the search results. In block 703, the component invokes the generate feature vectors component to generate feature vectors representing the candidate sight names. In block 704, the component invokes the score candidate sight names component to generate a score for the candidate sight names based on the generated feature vectors. In block 705, the component invokes the identify geographic names component to identify the candidate sight names that are geographic names. The component then returns as the sights the candidate sight names that are geographic names that satisfy a scoring threshold.

Figure 8:
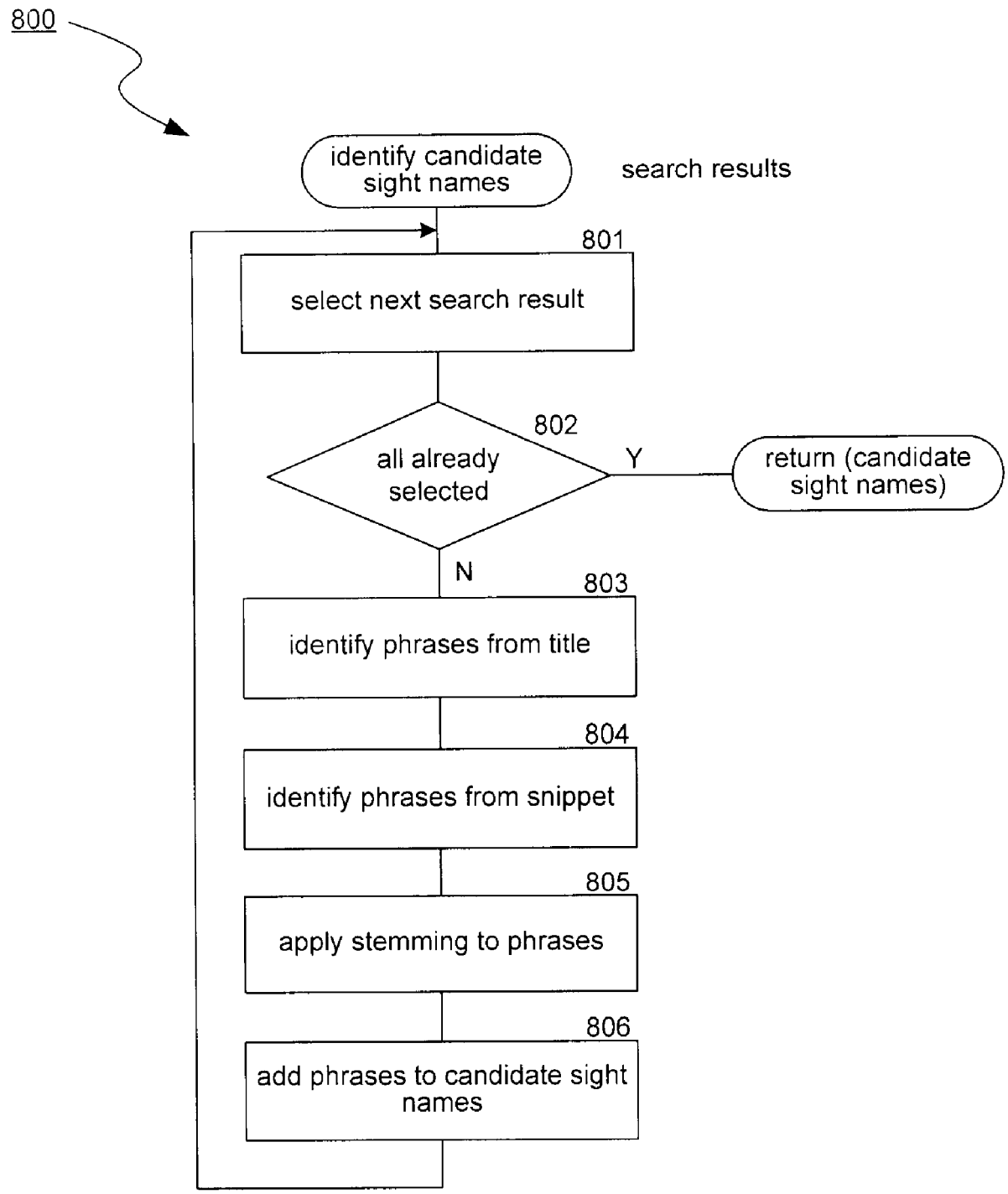
FIG. 8 is a flow diagram that illustrates the processing of the identify candidate sight names component of the tour system in one embodiment.

FIG. 8 is a flow diagram that illustrates the processing of the identify candidate sight names component of the tour system in one embodiment. The component 800 is passed search results and identifies candidate sight names from the search results. The tour system may identify candidate sight names using various techniques for identifying key or salient phrases. For example, the tour system may extract all phrases of certain lengths (e.g., n-grams) from the text of the search results and identify the various properties of the phrases such as phrase frequency, document frequency, phrase length, and so on. The tour system may identify the key phrases based on the properties of the phrases. The tour system may also filter the key phrases based on those that are unlikely to represent meaningful sight names (e.g., too many noise words), likely to represent the same sight (e.g., "Golden Gate Bridge" and "GoldenGate Bridge"), and so on. The tour system may also define a cluster of images for each key phrase as those images that contain the key phrase. The tour system may discard key phrases for clusters that have too many or too few images or that have too many images in common with other clusters. Techniques for identifying phrases from search results are described in Zeng, H., He, Q., Chen, Z., Ma, W., and Ma, J., "Learning to Cluster Web Search Results," SIGIR 2004, Jul. 25-29, Sheffield, South Yorkshire, U.K., and U.S. patent application Ser. No. 10/889,841, entitled "Query-Based Snippet Clustering for Search Result Grouping" and filed on Jul. 13, 2004, both of which are hereby incorporated by reference. One technique described in these references trains a linear regression model to learn the scores of phrases from feature vectors of the phrases. The tour system may use the linear regression model to score the likelihood that a phrase is a key or salient phrase and thus a candidate sight name. In block 801, the component selects the next search result. In decision block 802, if all the search results have already been selected, then the component returns the candidate sight names, else the component continues at block 803. In block 803, the component identifies the phrases from the title of the selected search result. In block 804, the component identifies phrases from other text (e.g., description) of the selected search result. In block 805, the component applies stemming to the phrases such as Porter's stemming. In block 806, the component adds the identified phrases as candidate sight names and then loops to block 801 to select the next search result.

Figure 9:
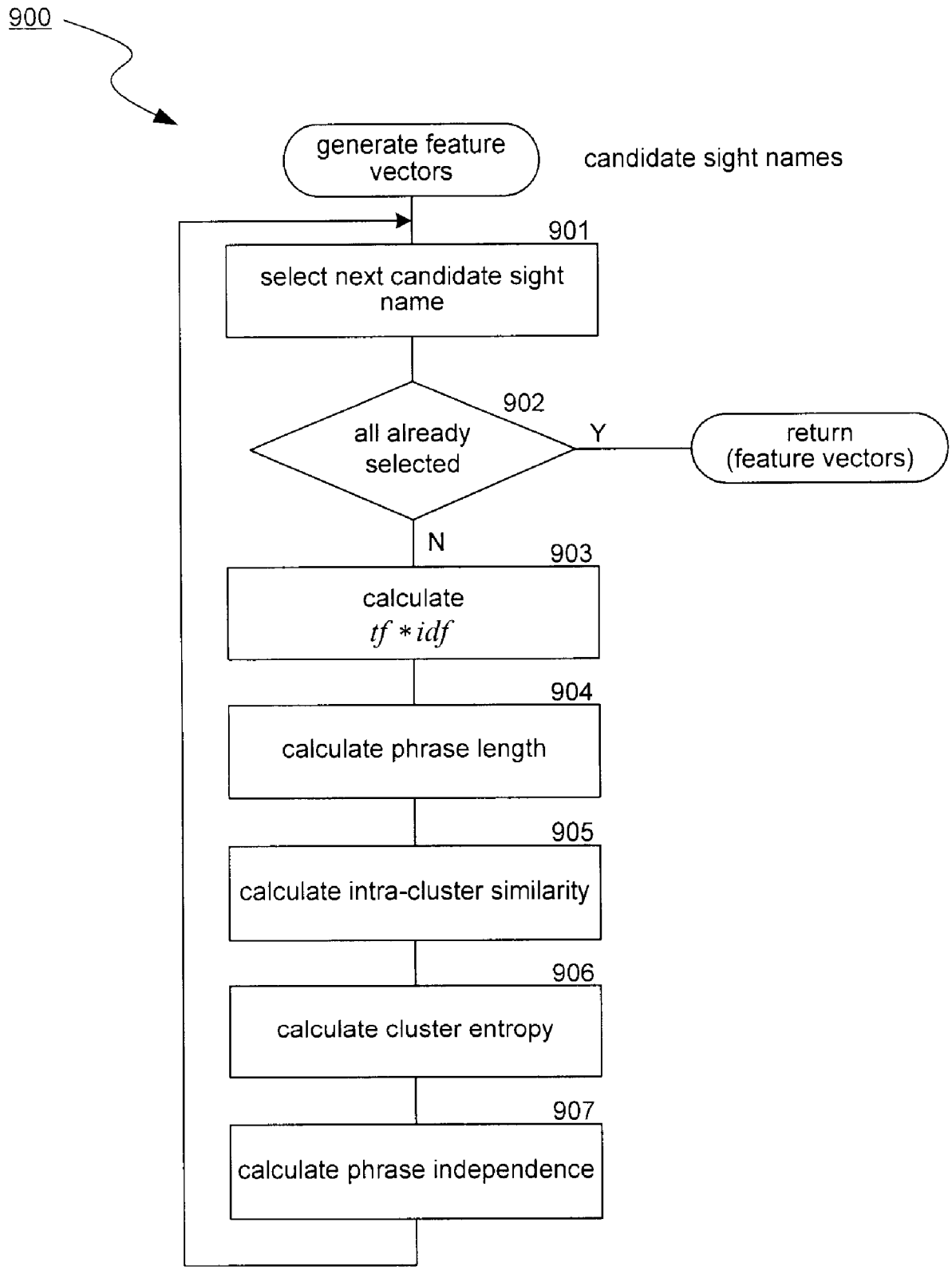
FIG. 9 is a flow diagram that illustrates processing of the generate feature vectors component of the tour system in one embodiment.

FIG. 9 is a flow diagram that illustrates processing of the generate feature vectors component of the tour system in one embodiment. The component 900 is passed candidate sight names and generates a feature vector for each candidate sight name that represents various features of the candidate sight name. In block 901, the component selects the next candidate sight name. In decision block 902, if all the candidate sight names have already been selected, then the component returns the feature vectors for the candidate sight names, else the component continues at block 903. In block 903, the component calculates a feature for the feature vector based on term frequency by inverse document frequency ("tf*idf"). In block 904, the component calculates a feature for the feature vector based on the length of the selected candidate sight name. In block 905, the component calculates a feature for the feature vector based on intra-cluster similarity. In block 906, the component calculates a feature for the feature vector to represent the entropy of the cluster. In block 907, the component calculates a feature for the feature vector that indicates the independence of the selected candidate sight name. The component then loops to block 901 to select the next candidate sight name. These features are described in described in Zeng, H., He, Q., Chen, Z., Ma, W., and Ma, J., "Learning to Cluster Web Search Results," SIGIR 2004, Jul. 25-29, Sheffield, South Yorkshire, U.K. The component may also factor into the score the quality of images associated with a candidate sight name. The component may normalize or transform to a standard scale the quality ratings of the image forums as described in U.S. patent application Ser. No. 11/339,328, entitled "User Interface for Viewing Images," which is hereby incorporated by reference.

Figure 10:
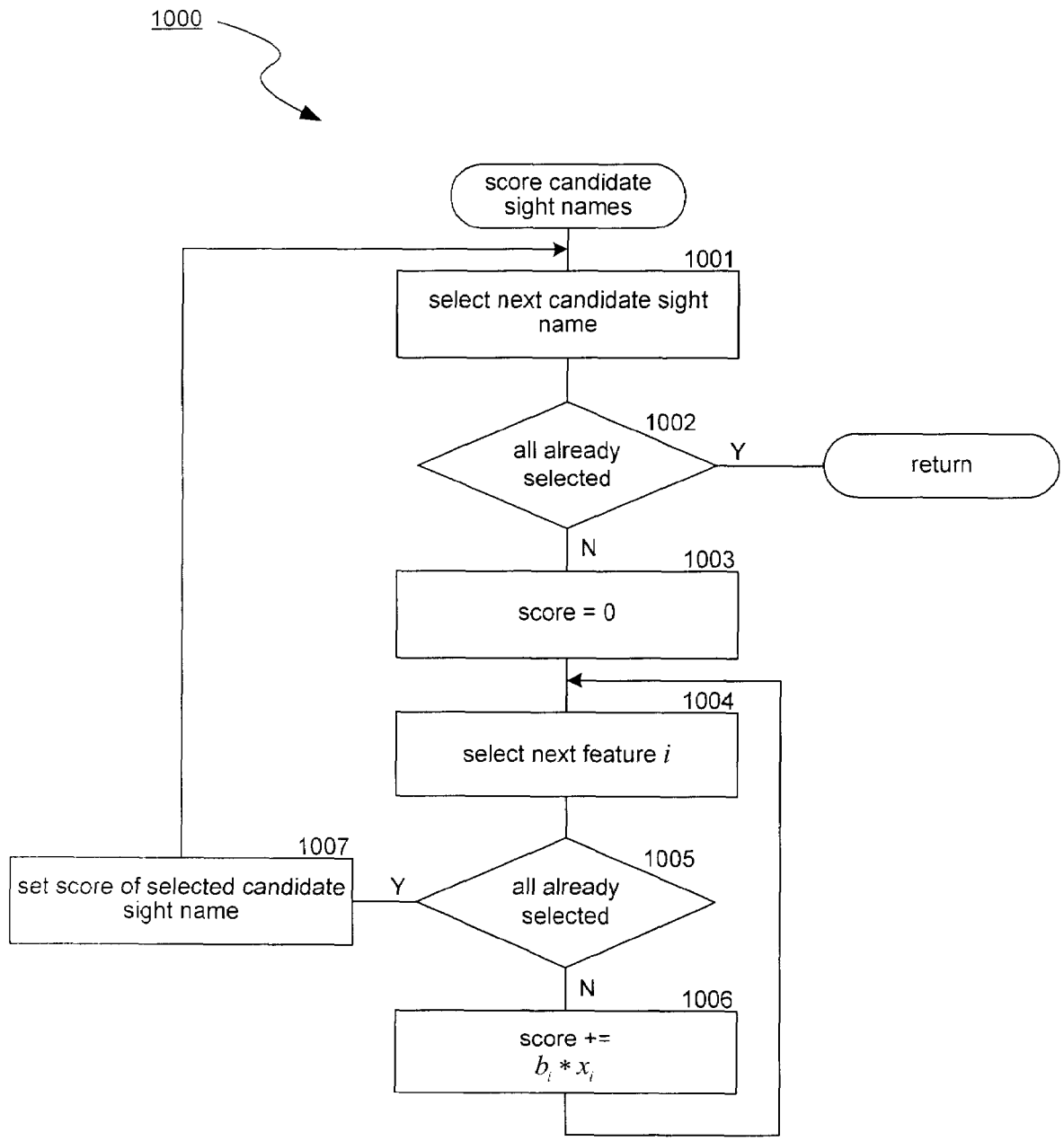
FIG. 10 is a flow diagram that illustrates the processing of the score candidate sight names component of the tour system in one embodiment.

FIG. 10 is a flow diagram that illustrates the processing of the score candidate sight names component of the tour system in one embodiment. The component 1000 generates a score for each candidate sight name that indicates the likelihood that a candidate sight name is a salient phrase of the search results. In block 1001, the component selects the next candidate sight name. In decision block 1002, if all the candidate sight names have already been selected, then the component returns, else the component continues at block 1003. In block 1003, the component initializes the score for the selected candidate sight name to zero. In blocks 1004-1006, the component loops accumulating a score for each feature i of the feature vector of the selected candidate sight name. In block 1004, the component selects the next feature of the feature vector for the selected candidate sight name. In decision block 1005, if all the features of the selected candidate sight name have already been selected, then the component continues at block 1007, else the component continues at block 1006. In block 1006, the component multiplies the value $x_i$ of the feature by a weighting factor $b_i$ and adds it to the score for the selected candidate sight name. The component then loops to block 1004 to select the next feature. In block 1007, the component sets a score of the selected candidate sight name and then loops to block 1001 to select the next candidate sight name.

Figure 11:
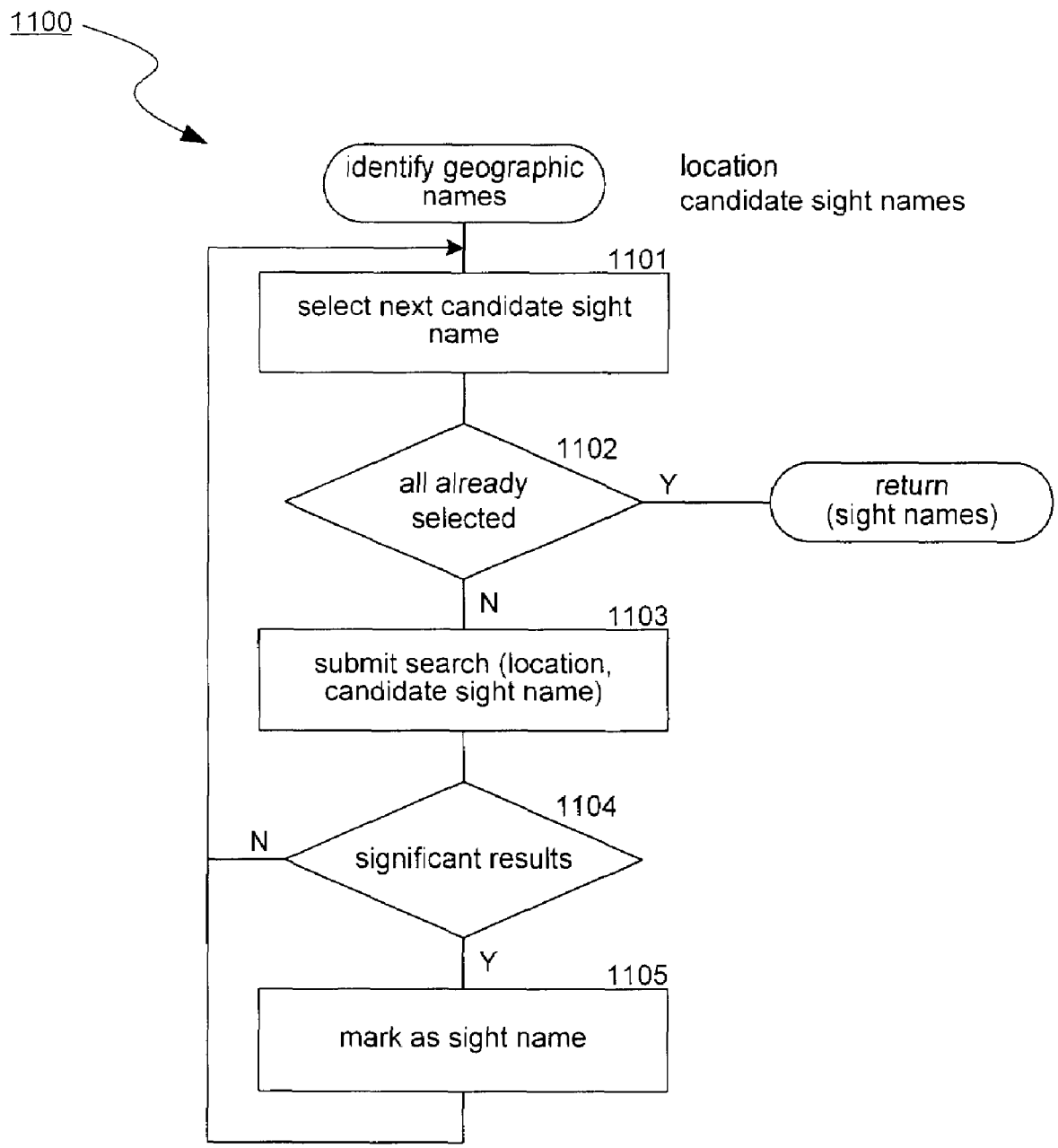
FIG. 11 is a flow diagram that represents the processing of the identify geographic names component of the tour system in one embodiment.

FIG. 11 is a flow diagram that represents the processing of the identify geographic names component of the tour system in one embodiment. The component 1100 is passed a location and candidate sight names for that location. The component identifies which of the candidate sight names represent geographic names and marks those candidate sight names as sight names. In block 1101, the component selects the next candidate sight name. In decision block 1102, if all the candidate sight names have already been selected, then the component returns the candidate sight names that are marked as sight names, else the component continues at block 1103. In block 1103, the component submits the location and the selected candidate sight name to a geographic name service. In decision block 1104, if the results provided by the geographic name service indicate that the selected candidate sight name corresponds to a geographic name, then the component continues at block 1105, else the component loops to block 1101 to select the next candidate sight name. In block 1105, the component marks the selected candidate sight name as a sight name and then loops to block 1101 to select the next candidate sight name.

Figure 12:
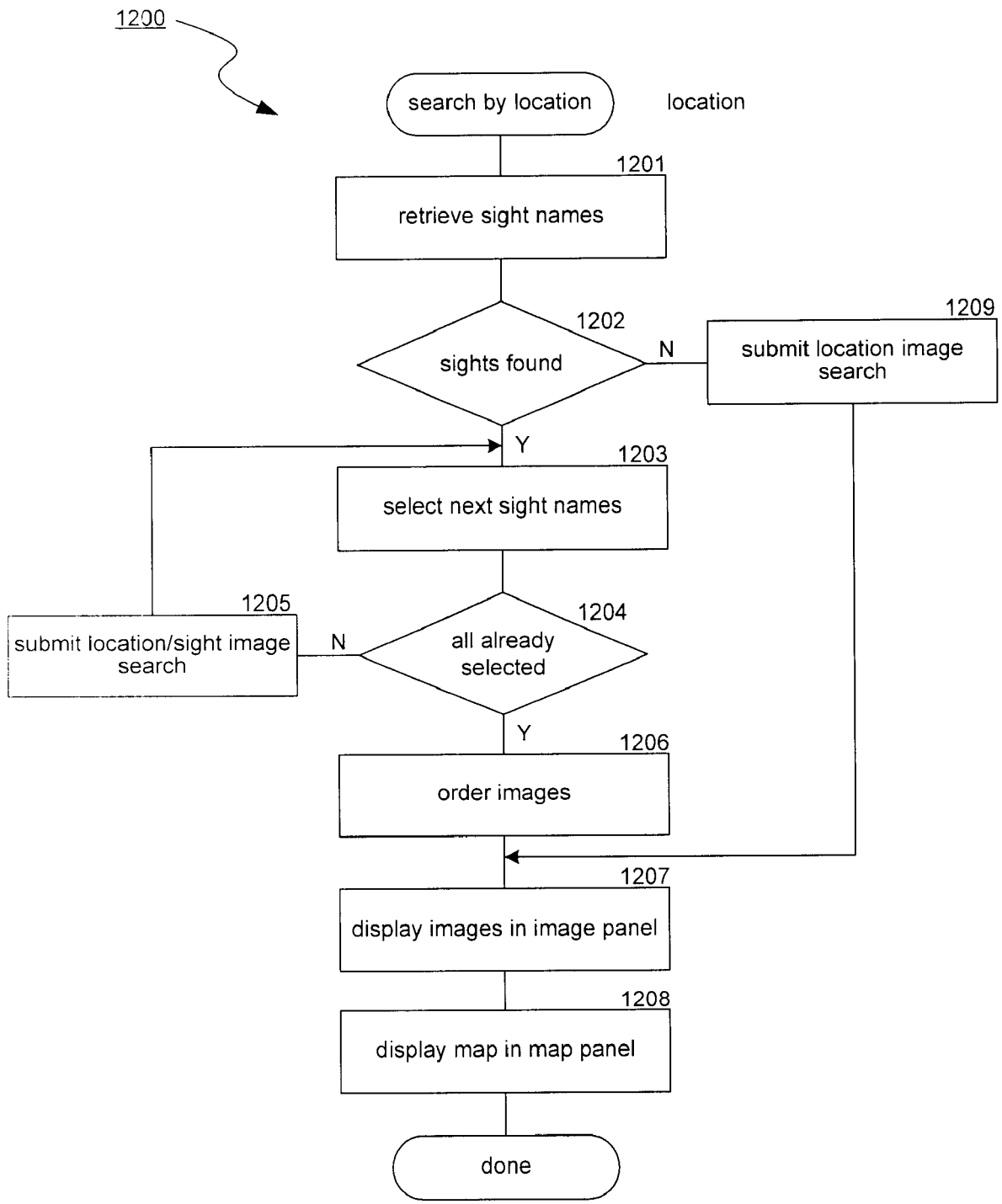
FIG. 12 is a flow diagram that illustrates the processing of the search by location component of the tour system in one embodiment.

FIG. 12 is a flow diagram that illustrates the processing of the search by location component of the tour system in one embodiment. The component 1200 is passed a location and displays images of sights associated with that location. In block 1201, the component retrieves the sight names for the passed location using the location/sight mapping. In decision block 1202, if sight names are found for the passed location, then the component continues at block 1203, else the component continues at block 1209. In blocks 1203-1205, the component loops submitting each of the retrieved sight names to an image search service to identify images corresponding to these sight names. In block 1203, the component selects the next retrieved sight name. In decision block 1204, if all the sight names have already been selected, then the component continues at block 1206, else the component continues at block 1205. In block 1205, the component submits the location and sight name as a query to an image search service. The search results identify the images and associated metadata for the selected sight name. The component then loops to block 1203 to select the next sight name. In block 1206, the component orders the images for display. In block 1207, the component displays the images in the image panel. In block 1208, the component displays a map in the map panel that encompasses the sights of the passed location. In block 1209, if no sight names for the passed location were found, then the component submits the location as a query to the image search service. The component then displays the images of the search result in the image panel and map centered at that location in the map panel. The component then completes.

Figure 13:
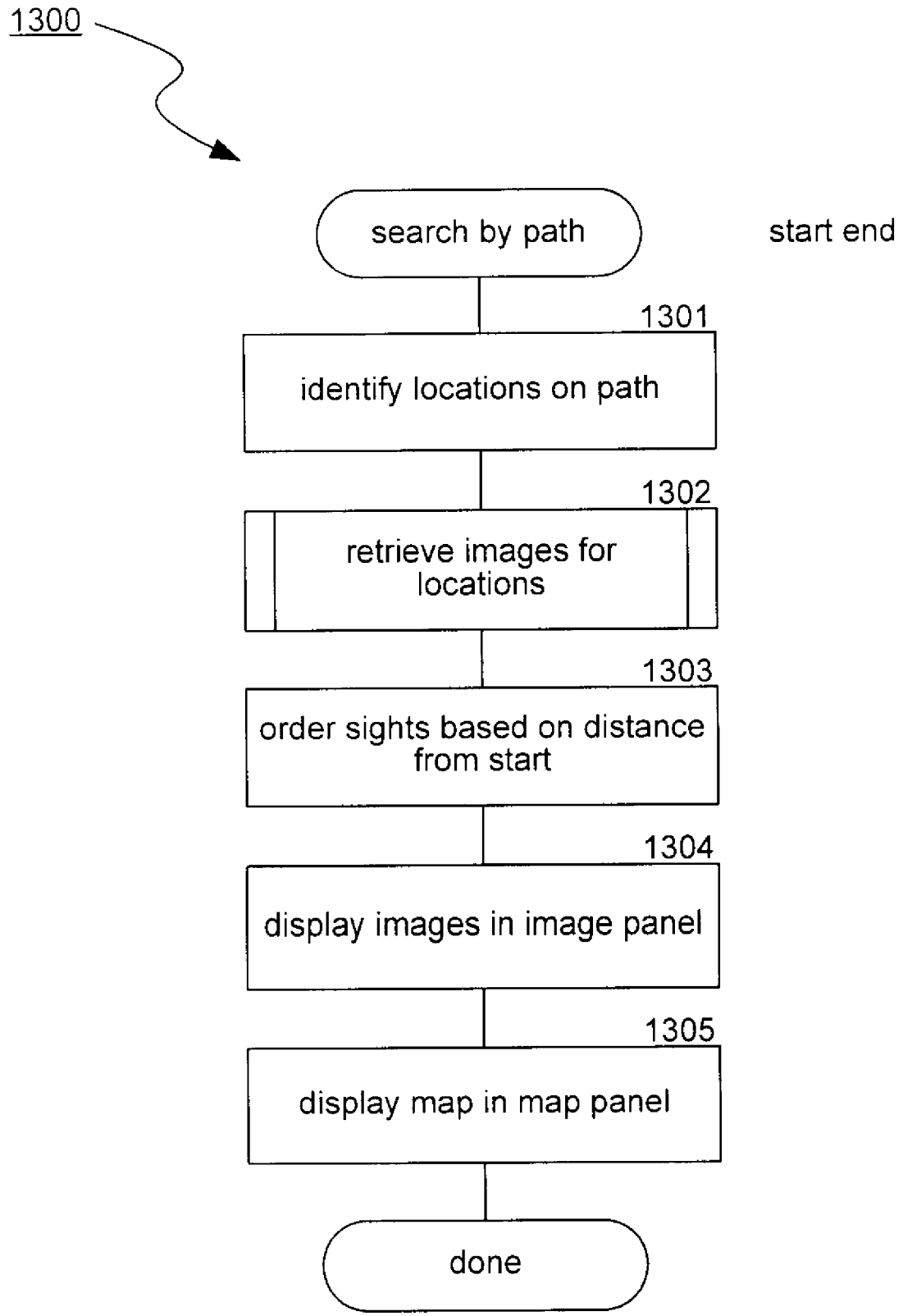
FIG. 13 is a flow diagram that illustrates the processing of the search by path component of the tour system in one embodiment.

FIG. 13 is a flow diagram that illustrates the processing of the search by path component of the tour system in one embodiment. The component 1300 is passed a start location and an end location. The component identifies locations along the travel path from the start location to the end location and displays images of sights associated with those locations. In block 1301, the component identifies locations on or near the path from the start location to the end location. In block 1302, the component invokes the retrieve images for locations component to retrieve images of sights of the identified locations. In block 1303, the component orders the images of the sights based on distance from the start location. In block 1304, the component displays the images in the image panel. In block 1305, the component displays a map in the map panel that illustrates the travel path from the start location to the end location and then completes.

Figure 14:
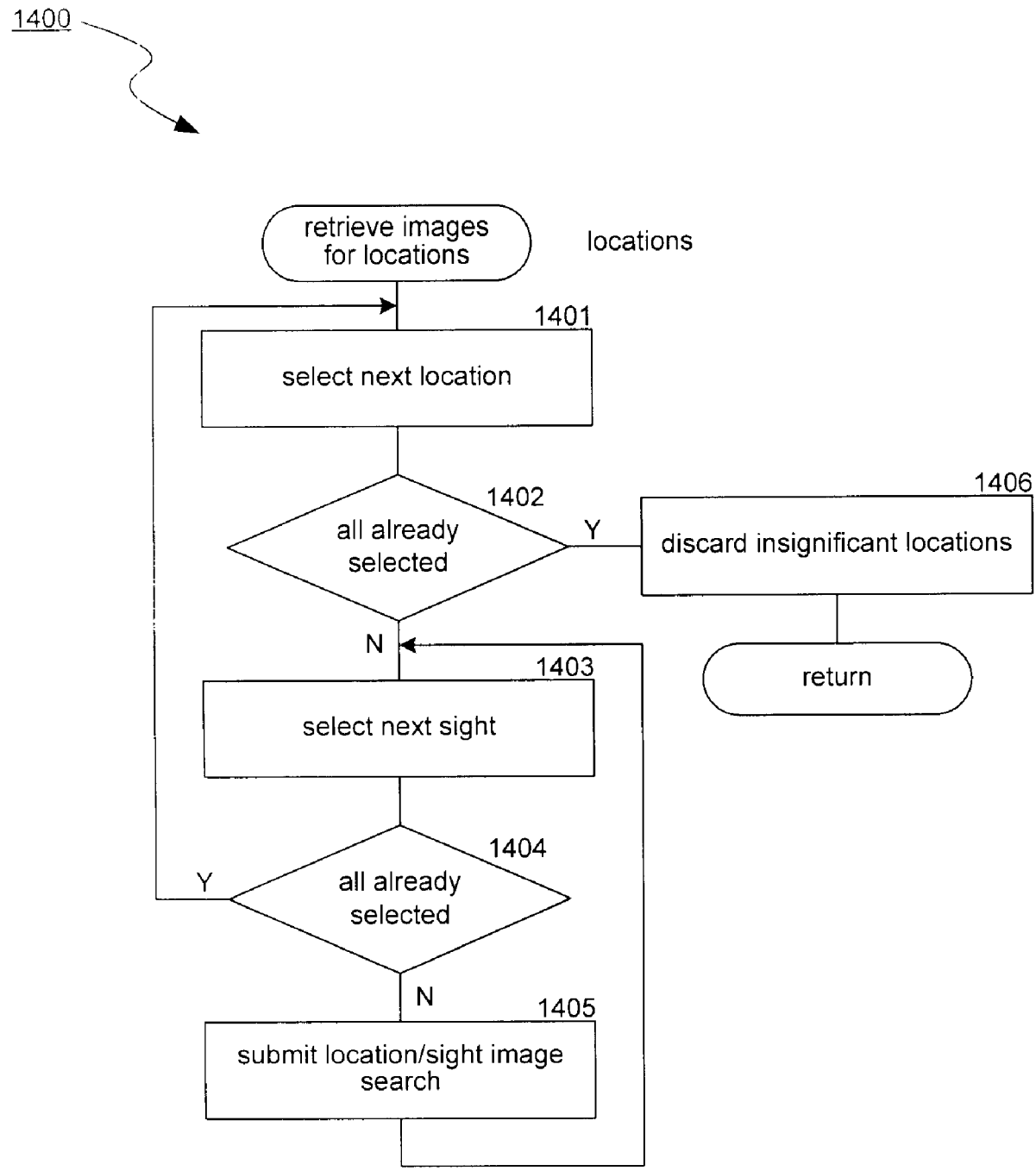
FIG. 14 is a flow diagram illustrating the processing of the retrieve images for locations component of the tour system in one embodiment.

FIG. 14 is a flow diagram illustrating the processing of the retrieve images for locations component of the tour system in one embodiment. The component 1400 is passed a list of locations and retrieves images of the sights associated with those locations. In block 1401, the component selects the next location. In decision block 1402, if all the locations have already been selected, then the component continues at block 1406, else the component continues at block 1403. In block 1403, the component selects the next sight for the selected location. In decision block 1404, if all the sights for the selected location have already been selected, then the component loops to block 1401 to select the next location, else the component continues at block 1405. In block 1405, the component submits a query that includes the selected location and selected sight to an image search service. The search results indicate the images associated with the selected sight. The component then loops to block 1403 to select the next sight. In block 1406, the component discards any locations with insignificant sights and then returns.

Figure 15:
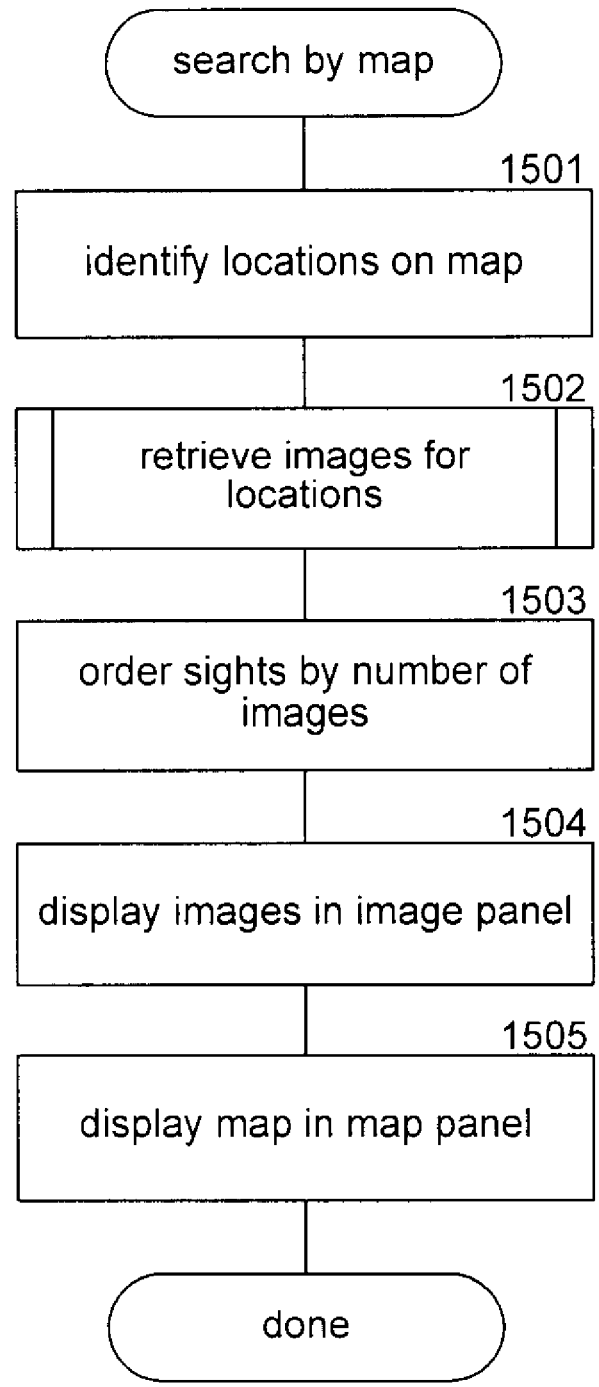
FIG. 15 is a flow diagram that illustrates the processing of the search by map component of the tour system in one embodiment.

FIG. 15 is a flow diagram that illustrates the processing of the search by map component of the tour system in one embodiment. The component 1500 identifies locations that are visible on the currently displayed map and displays images for the sights of those locations. In block 1501, the component identifies the locations visible on the map displayed in the image panel. In block 1502, the component invokes the retrieve images for locations component to retrieve images associated with the sights of the identified locations. In block 1503, the component orders the sights of each location by the number of images (or sight popularity). In block 1504, the component displays images of the sights in the image panel. In block 1505, the component displays a map in the image panel with the locations highlighted. The component then completes.

Figure 16:
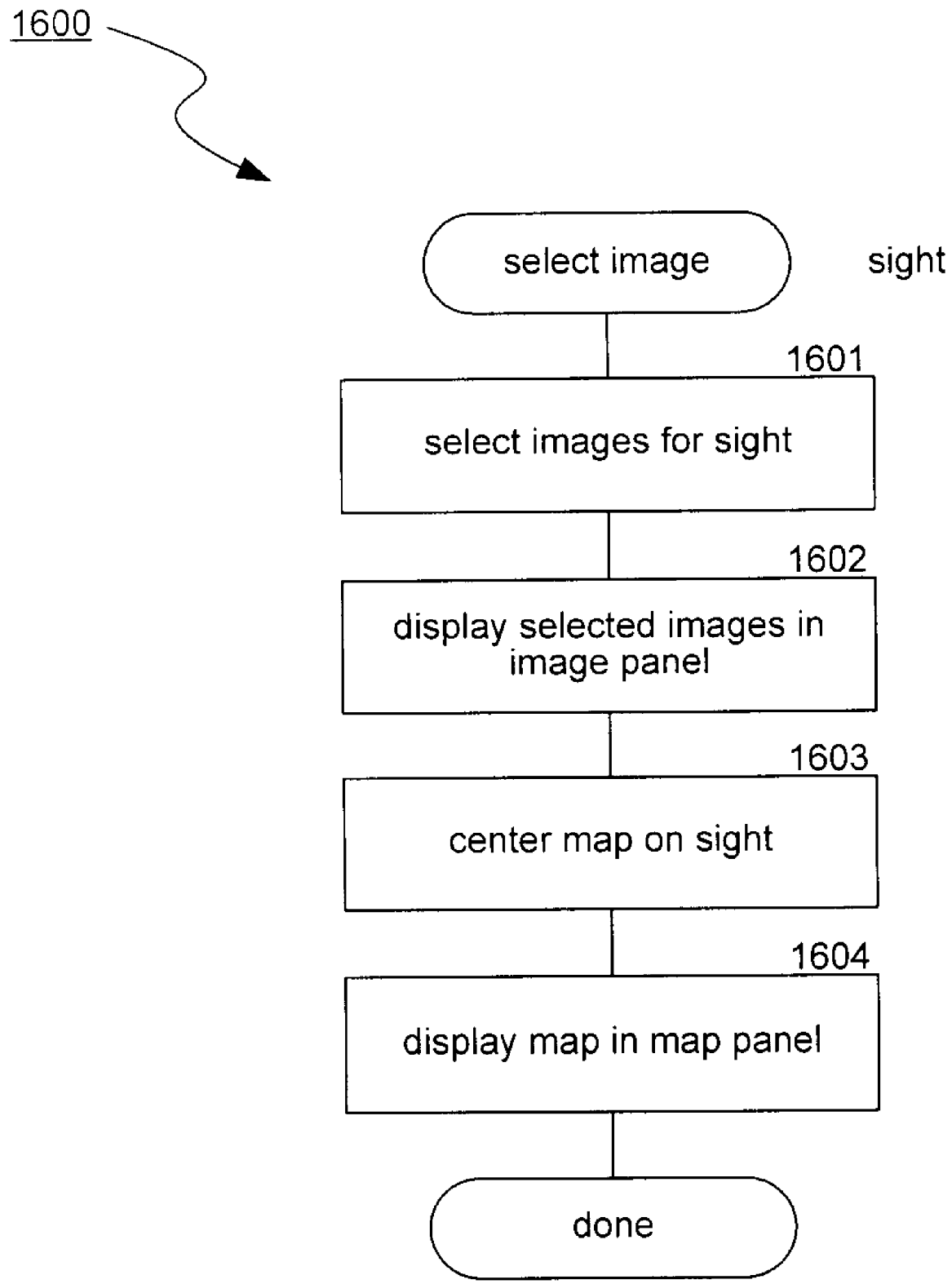
FIG. 16 is a flow diagram that illustrates the processing of the select image component of the tour system in one embodiment.

FIG. 16 is a flow diagram that illustrates the processing of the select image component of the tour system in one embodiment. The component 1600 is passed a sight and selects images for the sight. In block 1601, the component selects images for the passed sight. In block 1602, the component displays the selected images in the image panel. In block 1603, the component centers the map on the passed sight. In block 1604, the component displays the map in the map panel and then completes.

Figure 17:
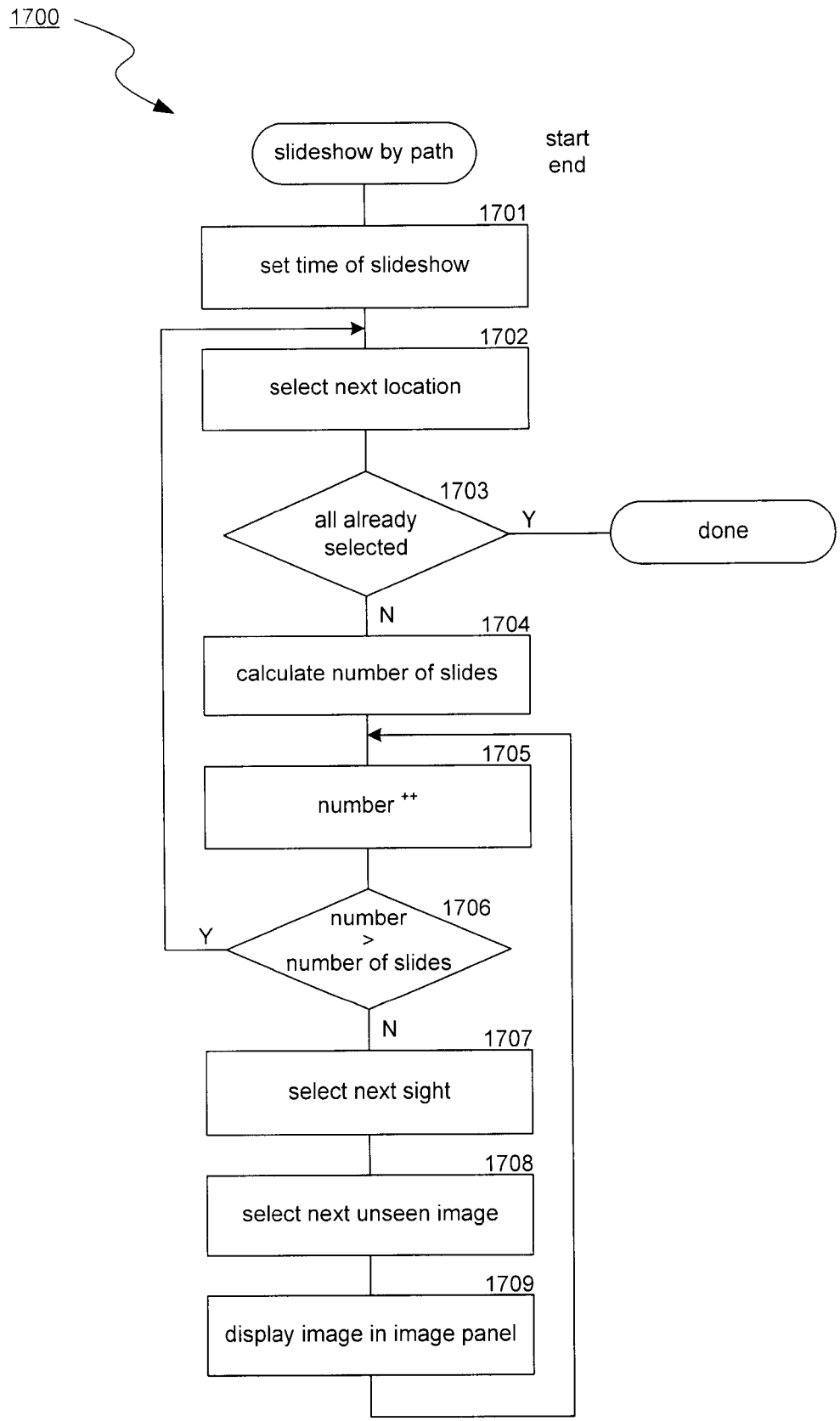
FIG. 17 is a flow diagram that illustrates processing of the show slideshow by path component of the tour system in one embodiment.

FIG. 17 is a flow diagram that illustrates processing of the show slideshow by path component of the tour system in one embodiment. The component 1700 is passed a start location and an end location and displays a slideshow of the sights encountered along a path from the start location to the end location. The tour system may also allow slideshows of sights of a single location. In block 1701, the component sets a time for the slideshow. The time may be specified by the user, a fixed time, or variable depending on length of path, number of travel locations, number of sights, and so on. In block 1702, the component selects the next location along the travel path. In decision block 1703, if all the locations have already been selected, then the component returns, else the component continues at block 1704. In block 1704, the component calculates the number of slides to be presented for the selected location. The number of slides may be a fixed number or may be dynamically generated based on time of the slideshow, number of sights for each location, number of locations, and so on. In block 1705, the component increments the number of slides that have been displayed. In decision block 1706, if the number of slides that have been displayed for the selected location is greater than the number of slides to be displayed for this location, then the component loops to block 1702 to select the next location, else the component continues at block 1707. In block 1707, the component selects the next sight of the selected location. In block 1708, the component selects the next unseen image for the selected sight. In block 1709, the component displays the image in the image panel. The component then loops to block 1705 to select the next sight. After the component selects all the sights, it may then start over by selecting the first sight of the selected location until the calculated number of slides is presented.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the tour system may submit candidate sight names to a service that identifies the names as being sights of interest. The tour system may identify candidate sight names using a web search service or other search service, rather than an image search service. In the case of a web search service, the tour system may extract salient phrases from titles and snippets of the search results. Accordingly, the invention is not limited except as by the appended claims.

We claim:

1. A computing system for identifying sights for locations, comprising:
    a memory storing computer-executable instructions of:
        a component that receives a start location and an end location;
        a component that identifies travel locations on a travel path from the start location to the end location;
        a component that identifies sights associated with the identified travel locations by, for each travel location,
            submitting, to an image search service, an indication of the travel location as a search request;
            receiving, from the image search service, metadata relating to images determined by the image search service to match the search request, the metadata for each image including a text description of the image;
            identifying, from the text description of the received metadata, candidate sights;
            submitting, to a geographic name service, an indication each candidate sight to determine whether the candidate sight corresponds to a geographic name; and
            when the geographic name service indicates that a candidate sight corresponds to a geographic name, indicating that the candidate sight is a sight identified with the travel location;
        a component that retrieves images associated with the identified sights; and
        a component that displays one or more of the retrieved; and
    a processor for executing the computer-executable instructions stored in the memory.

2. The computing system of claim 1 wherein the component that displays the retrieved images simultaneously displays a map encompassing the start location and the end location.

3. The computing system of claim 1 wherein the component that displays the retrieved images displays the images as a slideshow.

4. The computing system of claim 3 wherein the images of the slideshow are displayed in order encountered when traveling from the start location to the end location.

5. The computing system of claim 3 wherein the component that displays the retrieved images displays a map encompassing the start location and the end location and displays an indication of the travel location associated with images of the slideshow.

6. The computing system of claim 1 wherein the start location and the end location are indicated by a user selecting a path from the start location to the end location.

7. The computing system of claim 1 wherein the travel locations are identified based on distance from a travel path to the travel location.

8. The computing system of claim I including a component that, when a displayed image of a sight is selected, displays multiple images associated with the sight of the selected image.

9. The computing system of claim 1 wherein each displayed image represents a travel location.

10. The computing system of claim 9 wherein when an image is selected, displaying an image for each sight associated with the travel location represented by the selected image.

11. The computing system of claim 10 including a component that, when a displayed image representing travel location is selected, displays a map centered at the represented travel location.

12. A method in a computing system with a processor and a memory for identifying sights for locations, comprising:
 receiving by the computing system a start location and an end location;
 identifying by the computing system travel locations on a travel path from the start location to the end location; and
 identifying by the computing system sights associated with the identified travel locations by, for each travel location, submitting, to an image search service, an indication of the travel location as a search request;
 receiving, from the image search service, metadata relating to images determined by the image search service to match the search request, the metadata for each image including a text description of the image;
 identifying, from the text description of the received metadata, candidate sights;
 submitting, to a geographic name service, an indication each candidate sight to determine whether the candidate sight corresponds to a geographic name; and
 when the geographic name service indicates that a candidate sight corresponds to a geographic name, indicating that the candidate sight is a sight identified with the travel location
 wherein a travel location has associated sights that are identified based on submission of the travel location to an image search service, identification of candidate sights from metadata of the images received from the image search service, and submission the candidate sights to a geographic name service to determine whether a candidate sigh is a geographic name.

13. The method of claim 12 including retrieving images associated with the identified sights and displaying the retrieved images simultaneously with a map encompassing the start location and the end location.

14. The method of claim 13 including, when a displayed image of a sight is selected, displaying multiple images associated with the sight of the selected image.

15. The method of claim 12 wherein the start location and the end location are indicated by a user selecting a path from the start location to the end location.

16. The method of claim 12 wherein the travel locations are identified based on distance from a travel path to the travel location.

* * * * *

UNITED STATES PATENT AND TRADEMARK OFFICE
CERTIFICATE OF CORRECTION

| | | |
|---|---|---|
| PATENT NO. | : 7,657,504 B2 | Page 1 of 1 |
| APPLICATION NO. | : 11/548244 | |
| DATED | : February 2, 2010 | |
| INVENTOR(S) | : Jing et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 52 days.

Signed and Sealed this

Thirtieth Day of November, 2010

David J. Kappos
*Director of the United States Patent and Trademark Office*